(12) United States Patent
Colston et al.

(10) Patent No.: US 11,259,667 B2
(45) Date of Patent: Mar. 1, 2022

(54) GRILL WITH COLD SMOKE GRILLING MODES

(71) Applicant: Traeger Pellet Grills LLC, Salt Lake City, UT (US)

(72) Inventors: Michael V. Colston, Salt Lake City, UT (US); Daniel A. C. Altenritter, Riverton, UT (US); Daniel W. Sluder, Salt Lake City, UT (US)

(73) Assignee: Traeger Pellet Grills, LLC, Salt Lake City, UT (US)

( * ) Notice: Subject to any disclaimer, the term of this patent is extended or adjusted under 35 U.S.C. 154(b) by 88 days.

(21) Appl. No.: 16/362,492

(22) Filed: Mar. 22, 2019

(65) Prior Publication Data
US 2019/0290064 A1    Sep. 26, 2019

Related U.S. Application Data

(60) Provisional application No. 62/819,430, filed on Mar. 15, 2019, provisional application No. 62/648,213, filed on Mar. 26, 2018.

(51) Int. Cl.
*A47J 37/07* (2006.01)
*A23B 4/052* (2006.01)
(Continued)

(52) U.S. Cl.
CPC ........... *A47J 37/0704* (2013.01); *A23B 4/052* (2013.01); *A47J 37/0786* (2013.01); *F23B 40/08* (2013.01);
(Continued)

(58) Field of Classification Search
CPC ..... A47J 37/0704; A47J 37/0786; F23Q 7/02; F24B 13/04; F23B 40/08; F23N 3/002; F23N 1/002; F23N 5/102; A23B 4/052
See application file for complete search history.

(56) References Cited

U.S. PATENT DOCUMENTS 3,521,549 A * 7/1970 Funke .................... A23B 4/052
                                                  99/476
3,721,177 A * 3/1973 Booker .................. A23B 4/052
                                                  99/331
(Continued)

FOREIGN PATENT DOCUMENTS

EP     0947903 A1    10/1999
GB     2072887 A     10/1981

OTHER PUBLICATIONS

Great Britain Search Report from Application No. 1904200, dated May 29, 2019, 8 pages.

*Primary Examiner* — David J Laux
(74) *Attorney, Agent, or Firm* — TraskBritt

(57) ABSTRACT

A grilling device includes an auger feeder system, a heating element, a blower and a temperature control system. The temperature control system includes at least a first temperature sensor inside the firepot and a second temperature sensor inside a cooking chamber above the firepot. The heating element can also serve as the first temperature sensor. A method for controlling the temperature of the grill can include receiving temperature feedback information from one or more of the temperature sensors and adjusting power provided to the auger feeder system, heating element, and blower. The temperature control system produces cold smoke resulting from the combustion of lignin in solid wood fuel while minimizing temperatures inside the cooking chamber.

15 Claims, 10 Drawing Sheets

(51) Int. Cl.
  *F23N 5/10* (2006.01)
  *F23N 3/00* (2006.01)
  *F23N 1/00* (2006.01)
  *F23Q 7/02* (2006.01)
  *F24B 13/04* (2006.01)
  *F23B 40/08* (2006.01)

(52) U.S. Cl.
  CPC ............ *F23N 1/002* (2013.01); *F23N 3/002* (2013.01); *F23N 5/102* (2013.01); *F23Q 7/02* (2013.01); *F24B 13/04* (2013.01)

(56) References Cited

U.S. PATENT DOCUMENTS

| | | | | |
|---|---|---|---|---|
| 4,507,546 | A * | 3/1985 | Fortune | G05D 23/2401 219/483 |
| 4,770,157 | A * | 9/1988 | Shepherd | A47J 37/0713 126/25 R |
| 7,900,553 | B1 * | 3/2011 | Maurin | F23B 80/04 99/339 |
| 8,716,634 | B2 * | 5/2014 | Biller | H05B 3/12 219/494 |
| 9,140,448 | B2 * | 9/2015 | Freeman | F23B 50/12 |
| 9,289,096 | B2 * | 3/2016 | Barkhouse | A47J 36/321 |
| 9,603,484 | B2 * | 3/2017 | Cleveland | A47J 37/049 |
| 9,759,429 | B2 * | 9/2017 | Tucker | A47J 37/0704 |
| 9,814,354 | B2 * | 11/2017 | McAdams | A47J 37/0763 |
| 2009/0136638 | A1 * | 5/2009 | Fujie | A23L 13/65 426/314 |
| 2014/0326233 | A1 * | 11/2014 | Traeger | A47J 37/0704 126/25 R |
| 2014/0360387 | A1 * | 12/2014 | Bogdon | A23B 4/0523 99/476 |
| 2016/0327263 | A1 * | 11/2016 | Traeger | F24C 1/04 |
| 2017/0055549 | A1 * | 3/2017 | Jung | A23L 27/10 |
| 2017/0164783 | A1 * | 6/2017 | Sauerwein | A47J 37/0786 |
| 2017/0196400 | A1 * | 7/2017 | Colston | A47J 37/0786 |
| 2017/0367515 | A1 * | 12/2017 | Cornelissen | A47J 27/004 |
| 2018/0008093 | A1 * | 1/2018 | Parker | A47J 37/0704 |

* cited by examiner

GRILL WITH COLD SMOKE GRILLING MODES

CROSS-REFERENCE TO RELATED APPLICATIONS

This application claims priority to U.S. Provisional Patent Application No. 62/648,213, filed on Mar. 26, 2018. This application also claims priority to U.S. Provisional Patent Application No. 62/819,430, filed on Mar. 15, 2019. The entirety of each of the foregoing applications is hereby incorporated by reference.

TECHNICAL FIELD

The present invention relates generally to systems, methods, and devices for grilling and warming food products.

BACKGROUND

Many people prepare food on grilling devices such as solid fuel grills, smokers, gas grills, and the like. The flavor, moisture, texture, and other qualities of food that users prepare in such devices depends on a number of factors. One of the most important factors, of course, is the temperature at which a user cooks the food. In the case of solid fuel grilling devices such as smokers, it is important for the user to quickly and precisely control the temperature of the smoke produced from the ignition of solid fuel inside the smoker. That is, exposing the food to smoke that is too hot or too cold may result in the food having undesirable flavor, moisture, tenderness, or other poor qualities.

In addition, the ideal smoke temperature at which a user cooks food in a smoker varies depending on the type of solid fuel the user employs and the type of food the user is preparing. For example, smoke produced by the ignition of solid fuel in a smoker has a unique flavor that depends on the type of solid fuel producing the smoke. One type of solid fuel may produce smoke having one flavor, while another type of solid fuel may produce smoke having a different flavor. A user may need to maintain each type of smoke flavor at a unique temperature to most effectively transfer that flavor to the food. In many cases, a user may want a low temperature smoke (or "cold smoke") to produce the best flavor. In some cases, a user may want a high temperature smoke to most effectively cook food.

In addition, the various types of food a user cooks may each require unique temperatures or temperature regimes. For example, a user may need to expose a beef steak to a different smoke temperature than certain vegetables, even if the user uses the same type of solid fuel in both cases. Furthermore, a user may need to change the temperature of the smoke over time. For example, a user may want to initially smoke a certain type of meat at a high temperature to sear the outside of the meat and then gradually reduce the temperature over time. Also, for example, a user may want to smoke certain types of vegetables at a low temperature to begin with and then increase the temperature at the end to crisp the outer layer of the vegetables. These different temperatures and temperature regimes are referred to as "grilling modes."

One disadvantage of smokers compared to other grilling devices that employ gas or electric burners, is the increased pre-heating times required by smokers. In general, current smokers lack the functionalities and control systems necessary to quickly and precisely obtain a variety of temperatures and grilling modes from which a user can pick and choose depending on the type of solid fuel the user is employing and the type of food the user is preparing. Also, while current smokers typically provide basic temperature control capabilities, they usually require long pre-heating and temperature transition times.

Interestingly, producing a cold smoke often increases the required pre-heating time compared to the time required to produce a hotter smoke. This is because typical temperature control systems in smokers have a lag time built in to the control system feedback loop. For example, in a typical temperature control system feedback loop, a temperature sensor measuring the temperature of the smoke in the cooking chamber of a smoker relays temperature feedback information to a processor. Accordingly, the processor increases or decreases the rate at which a feeder introduces fuel into a combustion chamber (or "firepot") of the grilling device in order to increase or decrease the temperature accordingly.

However, when a user desires a low smoke temperature, a flame produced by runaway, self-sustaining combustion of the solid fuel being fed into the firepot during pre-heating may become too hot before the temperature sensor relays the temperature feedback information back to the processor to correct the temperature overshoot. When this happens, even if the fuel feeder completely stops feeding fuel into the firepot, the user must wait for the existing fuel to reduce down and reduce temperature, which takes time. In many instances, a cold smoke is produced from smoldering fuel rather than runaway combustion of fuel that produces a hot flame. Generally, waiting for the fuel to reduce down to a smolder after a flame has been produced, in order to correct the temperature control system overshoot and produce the desired cold smoke, takes longer than increasing the temperature in the firepot to obtain a hotter smoke.

Thus, there are a number of challenges and problems presented in the art of smokers and grilling devices that need to be addressed.

BRIEF SUMMARY

Embodiments of the present disclosure include systems, methods, and devices for producing cold smoke within grills, such as barbecue smokers, as well as components and/or sub-components thereof. These components and/or sub-components enable a user to generate smoke in the main oven or "cooking chamber" of a grilling device at low temperatures for extended durations. For example, a user can generate smoke and air temperatures within the cooking chamber of a grill at or below 150° F. for several hours at a time in a "closed-loop" environment. Additionally, or alternatively, the user can generate smoke and air temperatures within a cooking chamber of the grilling device at or below 120° F., at or below 100° F., at or below 90° F., and/or at or below 80° F., as described more fully herein.

In accordance with these and other ends, a grilling device in accordance with one embodiment comprises an oven having a cooking chamber for cooking food, and an auger feeder system integrated with the oven for delivering wood fuel. The grilling device also includes a firepot connected to the auger feeder system, the firepot having an interior space for receiving the wood fuel dispensed by the auger feeder system and a heating element powered by a power source, the heating element providing heat to the interior space of the firepot.

In addition, such an embodiment of the grilling device includes a blower powered by the power source, the blower providing oxygen to the interior space of the firepot, and a first temperature sensor located proximate the firepot, a second temperature sensor disposed proximate the cooking chamber, and a digital controller. Such an embodiment of a grilling device is configured in connection with the digital controller, the first and second temperature sensors, the heating element, and the blower to combust fuel in the firepot.

In one or more embodiments, a method of producing cold smoke within a grilling device for cooking food includes providing a grilling device as described above, which includes a firepot, heating element, blower, first temperature sensor, power source, and a processor. The method also includes igniting the solid fuel within the interior space of the firepot by activating the heating element and sensing temperature inside the firepot with the first temperature sensor and relaying firepot temperature information to the processor. In addition, the method includes adjusting electrical power provided to the heating element and blower based on the firepot temperature information to produce a temperature within the firepot in excess of 500° F. This is done while maintaining a second temperature in a cooking chamber of the grilling device, which is disposed above the firepot, below about 150° F. for a period of at least 5 minutes.

In at least one embodiment of the present disclosure, a grilling device for producing cold smoke for use in cooking or heating a food product includes a cooking chamber, a firepot having an interior space, a heating element configured to ignite fuel residing within the interior space of the firepot, a blower configured to circulate oxygen into the interior space of the firepot, a power source configured to provide electrical power within the grilling device. The grilling device also includes a processor and a storage comprising computer-executable instructions.

In such an embodiment, the computer-executable instructions, when executed, ignite the fuel within the interior space of the firepot by providing the heating element with a first amount of electrical power from the power source. The instructions then provide a second amount of electrical power to the heating element, the second amount of electrical power being less than the first amount of electrical power. The instructions then provide a second amount of electrical power to the heating element, the second amount of electrical power being less than the first amount of electrical power.

In this embodiment, the instructions then convert, at the processor, the electrical resistance measurement to firepot temperature information and adjust the electrical power provided to the heating element and blower based on the firepot temperature information. The adjustment prevents the fuel from entering into a state of continuous combustion and maintains a temperature within the cooking chamber of about 150° F. or less for at least five-minutes.

Additional features and advantages of exemplary implementations of the present disclosure will be set forth in the description which follows, and in part will be obvious from the description or may be learned by the practice of such exemplary implementations. The features and advantages of such implementations may be realized and obtained by means of the instruments and combinations particularly pointed out in the appended claims. These and other features will become more fully apparent from the following description and appended claims or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
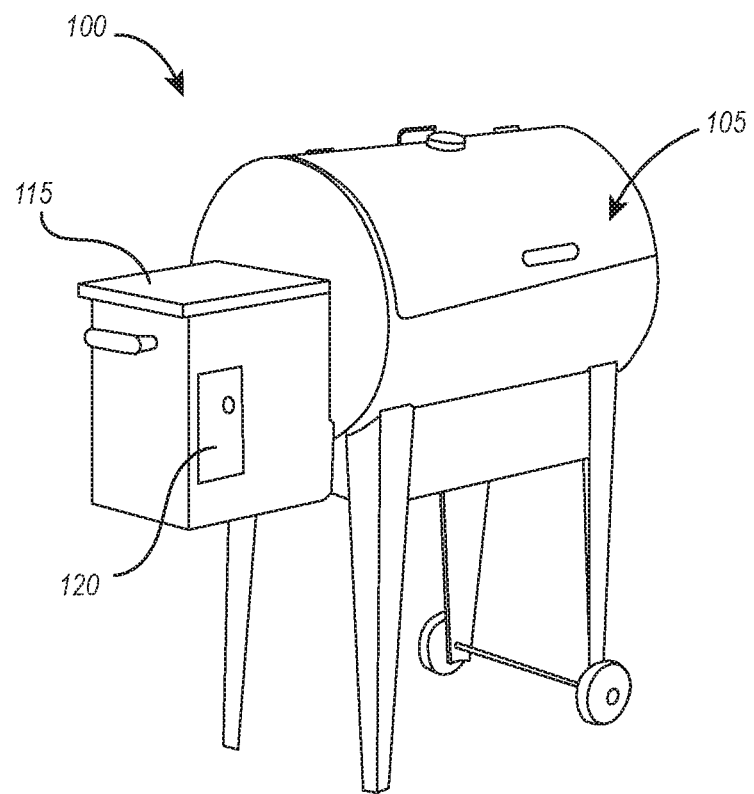
FIG. 1 is an illustration of an embodiment of a grilling device according to the present disclosure.

The present disclosure relates generally to systems, methods, and devices for producing cold smoke within grills, such as barbecue smokers, as well as components and/or sub-components thereof. These components and/or sub-components enable a user to generate smoke in the main oven or "cooking chamber" of a grilling device at low temperatures for extended durations. For example, a user can generate smoke and air temperatures within the cooking chamber of a grill at or below 150° F. for several hours at a time in a "closed-loop" environment. Additionally, or alternatively, the user can generate smoke and air temperatures within a cooking chamber of the grilling device at or below 120° F., at or below 100° F., at or below 90° F., and/or at or below 80° F., as described more fully herein.

In addition, implementations of the present invention provide devices that a user can adjust or be set to various cooking modes, including varying temperatures over time, to customize cooking modes and smoke temperatures within the grilling devices described herein. Users can apply mechanized, automated means to achieve various initial smoke/cooking temperatures with short pre-heat times and also change smoke/cooking temperatures quickly and precisely. Such extended duration, low temperature smoke processes (i.e., "cold smoke grilling modes") can provide ideal conditions for cooking and warming food products (e.g., smoked salmon, smoked cheese, etc.) that can only be prepared with heavy smoke but at temperatures approximating ambient temperatures.

In general, wood burning can be understood as occurring in approximately several different stages, commonly understood as three to four different stages. For example, the National Fire Protection Association (NFPA) lists the four stages of fire as "ignition," "growth," "fully developed," and "decay." Meanwhile the E3A organization (Exploring Energy Efficiency and Alternatives) describes the burning of wood in three steps, namely: "water evaporation," "smoke formation," and "charcoals." Others in the industry describe these stages with similar terminology, such as "start-up stage," "wood moisture stage," "creosote stage," and "heating stage." Still others subdivide the stages into smaller sub-categories, relating in part to how or when certain volatile compounds are released, or combusted.

Stages of Wood Burning

For purposes of this specification and claims, the stages of wood burning will be understood as falling into one of the following four categories, namely "moisture evaporation," "hydrocarbon vaporization," "gas vapor ignition/combustion," and "char burning."

Stage 1—Moisture Evaporation. During Stage 1, as the wood gains temperature, various volatile compounds in the wood begin to evaporate out of the wood, including some water. After reaching the water boiling point, i.e., 212° F., most or all of the water inside the wood evaporates, making the wood dry enough for initial combustion. The moisture evaporation stage absorbs rather than produces heat. As the wood surface temperature rises beyond about 212° F. to about 450° F. and higher, the wood breaks down to release major gases abundant in creosote, namely: carbon dioxide, carbon monoxide and acetic and formic acids. Such gases, however, do not ignite until the moisture evaporates, and the kindling temperature is hot enough.

Stage 2—Hydrocarbon Vaporization. As temperatures rise, the chemical structure of the wood molecules begins to break down via pyrolysis, producing compounds such as tar droplets and other combustible gases. In Stage 2, heat is still primarily absorbed rather than produced. The combustible gases are not, however, hot enough to themselves combust at this stage. Processes burning in this range produce visible smoke.

Stage 3—Gas Vapor Ignition and Combustion. As the wood burns at higher temperatures, generally at or above about 540° F., carbon reacts with oxygen to form combustible gases, such as carbon monoxide. If sufficient oxygen and heat are present, carbon monoxide will react with the oxygen to form carbon dioxide. Complete combustion of wood produces almost exclusively 1) water vapor, 2) carbon dioxide, 3) heat, and 4) noncombustible ashes. The less complete the combustion, the more carbon monoxide, combustible hydrocarbons, and other gasses are left unburned. Thorough combustion thus depends on combustible gases being exposed to sufficiently high temperatures of approximately 1100° F. to 1225° F., even as high as 2000° F. The smoke produced in these temperature ranges tends to be less visible (invisible or "blue" smoke), all or nearly all of the combustible materials are now combusting.

One will appreciate that the combustion temperatures needed to achieve efficient combustion can vary based on the amount of oxygen present. For example, lower amounts of oxygen will require higher temperatures to ignite the materials, while higher amounts of oxygen will allow for combustion at lower temperatures.

Stage 4—Char Burning. As understood from 2019 National Fire Protection Association (NFPA) Glossary of Terms, the term "char" refers to the formation of a brittle residue when material is exposed to thermal energy. Along these lines, charred wood comprises brittle residue wood. Charred wood can still combust further, but generally requires direct contact with oxygen in order to burn and occurs only after the initial stages have completed. Specifically, after the first three stages, the only remaining combustible material is the carbon in the charcoal, which burns with little or no flame.

Continuous Combustion vs. Smoldering

As understood from NFPA, and as used herein, the term "combustion" refers to a chemical process of oxidation that occurs at a rate fast enough to produce heat.

As also understood from NFPA, and as used herein, the terms "ignition" or "ignite" refer to a state of providing sufficient heat to initiate the first stages of combustion. Similarly, NFPA defines the term "autoignition" as initiation of combustion by heat but without a spark or flame. For example, at certain temperatures (compared with certain levels of oxygen), wood pellets no longer need to be ignited by an external heat source in order to combust, and simply combust on their own in response to given environmental conditions.

As such, "combustion" can be thought of and/or referred to in a variety of contexts, including the initial stages 1 or 2, where sufficient heat causes decomposition of a fuel source (e.g., interchangeably with "ignition,") up through stages 3 and 4, where sufficient heat is present so that other chemical decomposition processes occur, such as with oxidation, without further stimulus (e.g., "autoignition"). This is also referred to herein as "continuous combustion," or "burning" (see NFPA 2019 glossary).

In contrast with continuous combustion, "smoldering," as used herein, is not self-sustaining or continuous without an external heat source. With reference to the four Stages listed above, smoldering generally occurs after Stage 1, and at a point between Stages 2 and 3. Smoldering does not result in enough environmental heat to cause sustained ignition (or autoignition) of the surrounding pellets that are not in direct contact with the heat source, and hence cannot be maintained to the point of exhausting the surrounding wood pellets through continuous combustion or autoignition.

Smoke Byproducts

As noted above, smoke contains a number of byproducts, such as soot, ash, and creosote. Using the definitions provided in the 2019 NFPA Glossary of Terms: the term "ash," as used herein, means solid residue that remains after combustion is complete; and "soot," as used herein, means particles of carbon produced in a flame. Soot is the byproduct of incomplete combustion.

Creosote (i.e., wood creosote) is an oily compound derived from wood combustion comprising a number of phenol derivatives, including decomposed/pyrolyzed lignin in the form of guaiacol ($C_6H_4(OH)(OCH_3)$), and syringol (1,3-Dimethoxy-2-hydroxybenzene). Of these, syringol is understood as the main chemical responsible for the smoky aroma in a barbecue, while guaiacol contributes to taste.

Lignin derivatives are the largest contributors to desirable smoke flavor, and are typically broken down in Stage 3 processes, namely temperatures from about 540° F. to about 1000° F., preferably about 752° F. to about 923° F.

As such, creosote, particularly lignin derivatives, can positively enhance flavor and color of smoked foods, and can act as a preservative. However, if the balance of chemicals in creosote shifts unfavorably, it causes food to taste bitter. For example, visible smoke arises from a lower temperature inefficient burn, contains a higher ratio of soot and ash, and produces a more bitter flavor in food. Invisible smoke produced at higher temperatures in Stage 3 contains a lower ratio of carbon and ash, a higher ratio of lignin decomposition products, and produces a more desirable flavor and appearance in food.

Cold Smoke

In view of the foregoing, "cold smoke" in accordance with implementations of the present invention is smoke produced by smoldering fuel while at the same time restricting continuous combustion of the fuel. In particular, cold smoke in accordance with the present invention is produced by intermittently applying certain environmental conditions to a localized subset of wood pellets in a firepot so that those particular wood pellets can achieve the appropriate level of Smoke Byproducts (i.e., early Stage 3 levels of combustion) while effectively maintaining the remaining wood pellets in Stage 1 and Stage 2 conditions. As such, cold smoke requires repeated ignition of fuel to maintain smoldering over a period of time such as from about 5 minutes to about 1 hour, about 2 hours, about 3 hours, about 4 hours, or about 5 hours or more.

At least one reason for this is that the heat applied by the external heat source is low enough, or sufficiently discontinuous or intermittent, that the environmental heat is too low to cause ongoing autoignition, or burning. In addition, as noted above, providing enough oxygen to the wood pellets at the right time, in combination with the low temperature, intermittent heat source, allows Smoke Byproducts formed in Stage 3 levels of combustion to be produced in the firepot while maintaining a low temperature in the main oven. Thus, embodiments of grills described herein create ideal environmental conditions for intermittently igniting a localized subset of wood pellets at least through the control of the heat source and blower (oxygen source) while still maintaining relatively low oven temperature levels. Specifically, embodiments of the invention optimize creation of lignin byproducts in the firepot while maintaining a relatively low temperature of smoke and air in the cooking chamber.

For example, cold smoke produced from fuel smoldering just prior to or during early Stage 3, or during a transition from Stage 2 to Stage 3, is done in such a way as to breakdown lignin in the firepot while still maintaining temperatures in the main oven less than or equal to about 150° F., preferably about 120° F. to about 150° F., less than or equal to about 120° F., preferably about 100° F. to about 120° F., less than about 100° F., preferably about 90° F. to about 100° F., less than about 90° F., preferably about 80° F. to about 90° F., less than about 80° F., preferably about 70° F. to about 80° F., and/or at temperatures up to about 70° F.

Accordingly, the term "cold smoke grilling mode," as used herein, typically refers to features and settings of a grilling device's oven and firepot that are manipulated to produce the ideal components of smoke in the firepot while maintaining a low oven temperature.

Cold Smoke Grilling Devices and Methods

The various embodiments of grilling devices described herein can provide a desirable smoke at lower temperatures (i.e., cold smoke) that transfers preferable flavors and aromas to food.

Turning now to the figures, FIG. 1 shows that grilling device 100 includes an upper food warming/cooking chamber 105 in which a user can prepare food. The grilling device 100 of FIG. 1 also includes a lower portion disposed beneath the warming/cooking chamber 105, which houses an auger feeder system and a firepot. The lower portion below the warming/cooking chamber 105 can also include various other components, such as a blower and heating element. These systems, and other components housed within the lower portion below the warming/cooking chamber 105, are shown and described in more detail below with reference to FIGS. 2-5.

Referring still to FIG. 1, the illustrated embodiment of the grilling device 100 also includes a hopper 115 and a user control interface 120. A user can open the top portion of the hopper 115 and introduce fuel, such as wood pellets, into the feeder system of the lower portion of the grilling device 100 through the hopper 115. A user can adjust a control knob, or various other control interface buttons, to adjust a temperature of the food warming/cooking chamber 105 of the grilling device 100. Again, subsequent FIGS. 6-8 and the discussion below shed more light on the user control interface and temperature control features of the grilling device 100, particularly in relation to cold smoke and related methods.

One will appreciate that the embodiment of the grilling device 100 shown in FIG. 1 is an example of a grilling device according to the present disclosure. One or more embodiments of a grilling device 100 may comprise other components. For example, in one or more embodiments, the user control interface 120 may comprise a display screen, multiple other buttons or knobs, and/or touch-screen technology.

In addition, one or more embodiments of a grilling device 100 may include similar components rearranged in different locations relative to one another without affecting the basic functionality of the grilling device 100. For example, one or more embodiments of a grilling device 100 may include a hopper 115 on the right side of the grilling device 100 or a user control interface 120 located elsewhere on the grilling device 100.

Also, for example, one or more embodiments of the grilling device 100 can include a direct-current power source, not shown in FIG. 1. In one or more embodiments of a grilling device 100, the direct-current power source can comprise a lithium-ion battery. One or more embodiments can include other direct-current power sources. For example, in one or more embodiments, the grilling device 100 can include one or more alkaline batteries. The grilling device 100 can also include other direct-current power supplies. Additionally, or alternatively, the grilling device 100 can include one or more alternating-current power sources and one or more rectifiers.

One will also appreciate that a manufacturer can dispose the direct-current power supply at various locations within or on the outside of the grilling device 100. The direct-current power source can power the various components of the grilling device 100, including but not limited to, the auger 205, blower, heating element, and an electronic display of the user control interface 120.

Figure 2:
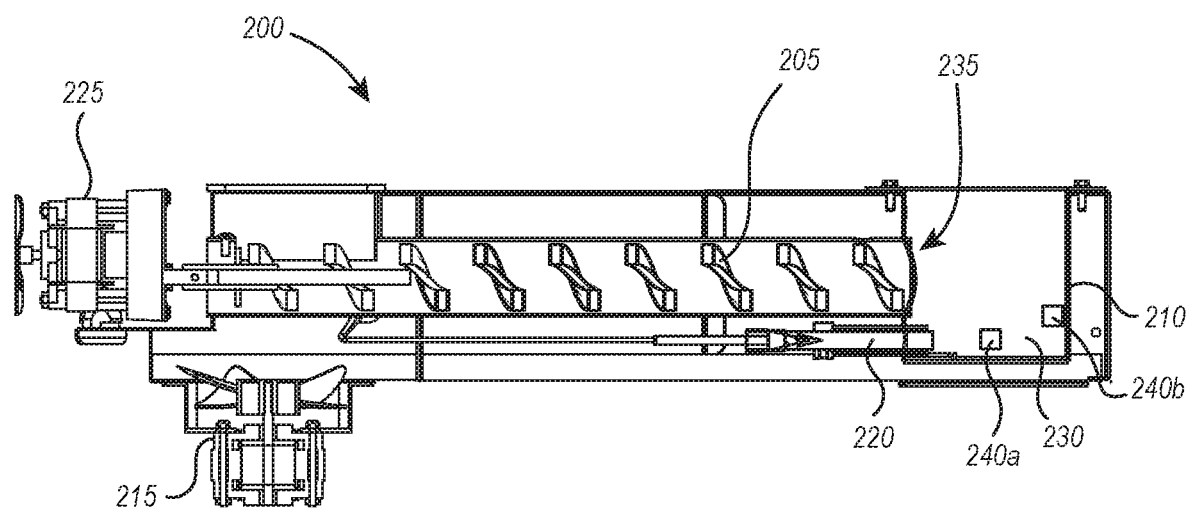
FIG. 2 illustrates an embodiment of an auger feeder system within the grill shown in FIG. 1, including an auger, firepot, blower, and heating element according to the present disclosure.

Along these lines, FIG. 2 illustrates an embodiment of an auger feeder system 200 within the grilling device 100 shown in FIG. 1, powered by a power supply, such as a direct current power supply described herein. The illustrated embodiment of FIG. 2 includes an auger 205, firepot 210, blower 215, heating element 220, and one or more temperature sensors 240a-240b. As shown, a motor 225 can engage the auger 205 at one end to rotate the auger 205. A firepot 210 is disposed at the other end of the auger 205 to receive fuel pellets into an interior space 230 of the firepot 210 through an opening 235 in the side of the firepot 210.

Further, FIG. 2 shows that the heating element 220 is disposed at or near the interior space 230 of the firepot 210. In addition, a manufacturer can dispose the blower 215 within or in communication with the lower portion below the warming/cooking chamber 105 of the grilling device 100. In this way, the blower 215 can circulate air (specifically, oxygen) throughout the lower portion and over and/or around the heating element 220. This air that flows over the heating element 220 can enter the interior space 230 of the firepot 210 after passing over the heating element 220. In this way, the blower 215 can increase or decrease combustion of the fuel inside the firepot 210 by providing or reducing available oxygen to the firepot 210. The blower 215 also drives convective heating when it blows oxygen past the heating element 220 within the interior space 230 of the firepot 210.

Additionally, as noted above, the auger feeder system 200 may comprise one or more temperature sensors 240a-240b disposed within or near the interior space 230 of the firepot 210, in addition to one or more temperature sensors in the main oven, as discussed more fully herein. The one or more temperature sensors 240a-240b illustrated in FIG. 2 are configured to detect the temperature inside the firepot 210 as fuel combusts. One will appreciate that one or more embodiments may include more or less than the number of temperature sensors 240a-240b shown in FIG. 2. For example, in one or more embodiments, the auger feeder system 200 may include one temperature sensor, three temperature sensors, four temperature sensors, five temperature sensors, or more than five temperature sensors.

In addition, one or more embodiments of an auger feeder system 200 may comprise one or more temperature sensors 240a-240b that are disposed at locations other than those locations shown in the figures, within or near the interior space 230 of the firepot 210. For example, in one or more embodiments, the firepot 210 may include one or more temperature sensors 240 disposed on the sidewalls of the interior space 230 of the firepot 210, the floor of the firepot 210, or both. In one or more embodiments, a manufacturer may dispose the one or more temperature sensors 240 just above, just below, or otherwise just outside the interior space 230 of the firepot 210.

One will appreciate that a manufacturer can dispose one or more temperature sensors 240 at any number of locations within or near the interior space 230 of the firepot 210 so that the temperature sensors 240 detect a temperature within the interior space 230 of the firepot 210.

Figure 3:
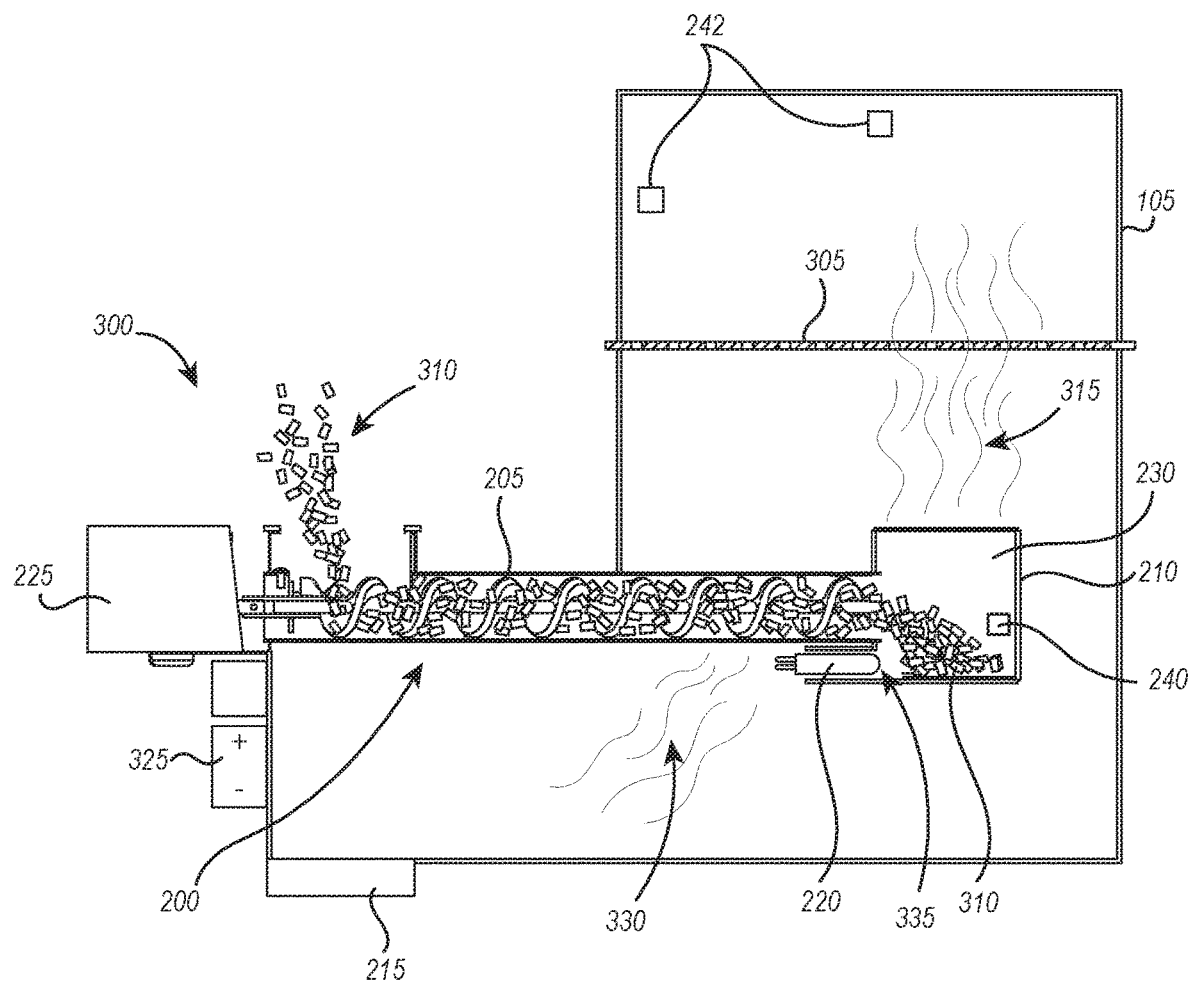
FIG. 3 illustrates a cross-sectional view of an embodiment of an auger feeder system feeding fuel into a firepot for combustion according to the present disclosure.

FIG. 3 illustrates an embodiment of an auger feeder system 300 in use. FIG. 3 shows an embodiment of the auger feeder system 300 similar to the embodiment shown in FIG. 2. In addition, FIG. 3 shows a grilling surface 305 inside the warming/cooking chamber 105, fuel 310 such as wood pellets, and a direct current power source 325. One will appreciate that types of fuel 310 other than fuel pellets may also be used.

FIG. 3 also illustrates two temperature sensors 242 disposed inside the warming/cooking chamber 105. In at least one embodiment, these two temperature sensors 242 are configured to sense the temperature of smoke inside the warming/cooking chamber 105. The location of temperature sensors 242 inside the warming/cooking chamber 105 may vary. For example, in at least one embodiment, the temperature sensors 242 are disposed on the side and middle of the warming/cooking chamber 105.

Also, in at least one embodiment, the warming/cooking chamber 105 comprises more or less than the two temperature sensors 242 shown in FIG. 3. For example, in at least one embodiment, the warming/cooking chamber 105 includes only one temperature sensor 242. In at least one embodiment, the warming/cooking chamber 105 includes three or more temperature sensors 242 disposed therein.

In addition, in at least one embodiment, the grilling device 100 includes only one temperature sensor 242 disposed in the warming/cooking chamber 105 and no other temperatures sensors (other than the hot-rod, heating element 220). Additionally, or alternatively, any one of the temperature sensors 242, 240, 240a, 240b described herein may be employed alone in the grilling device 100 or in combination with one or more other temperature sensors 242, 240, 240a, 240b, either solely in the warming/cooking chamber 105, within or near the firepot 210, or both.

In the embodiment illustrated in FIG. 3, a user can feed the fuel 310 into the auger 205 via a hopper 115. The motor 225 engages the auger 205 and rotates the auger 205. The rotating auger 205 feeds a limited amount of fuel 310 into the interior space 230 of the firepot 210 for ignition. Ignition of the fuel 310 produces heat and smoke 315, which rises to heat and/or exposes the grilling surface 305 to the smoke 315. Notably, in order to maintain a cold smoke, the pellet grilling device 100 directs the auger to dispense only a few pellets at a time so that the pellets can be at least partially combusted without generating enough heat within the main oven to exceed cold smoke temperatures, such as main oven temperatures from about 70° F. to about 150° F.

As shown, the blower 215 blows air 330 over the heating element 220, through an opening 335 in the firepot 210, and into the interior space 230 of the firepot 210 where the fuel 310 resides. In such an embodiment, the direct-current power source 325 provides electrical power to the heating element 220, thus heating the heating element 220 through resistive heating. The air 330 blown over the heating element 220 then passes to the fuel (pellets) 310 inside the firepot 210, causing convective heat transfer for ignition. Alternatively, the heating element 220 is positioned in direct contact with the pellets to provide more direct heat. Once ignited, the fuel 310 smolders to produce heat and smoke 315 that rises to warm/heat and expose the grilling surface 305 of the pellet grilling device 100 to the smoke 315.

In addition, in at least one embodiment, the firepot 210 includes perforations in the floor and/or sidewalls thereof. In such an embodiment, the air 330 circulated by the blower 215 enters the firepot 210 through the perforations to provide oxygen to combusting fuel 310.

Additionally, or alternatively, in one or more embodiments, the heating element 220 may extend into the interior space 230 of the firepot 210. In this way, the heating element 220 can also transfer heat to the fuel 310 via conductive heat transfer to the fuel 310 due to direct contact between the heating element 220 and fuel 310.

Figure 4:
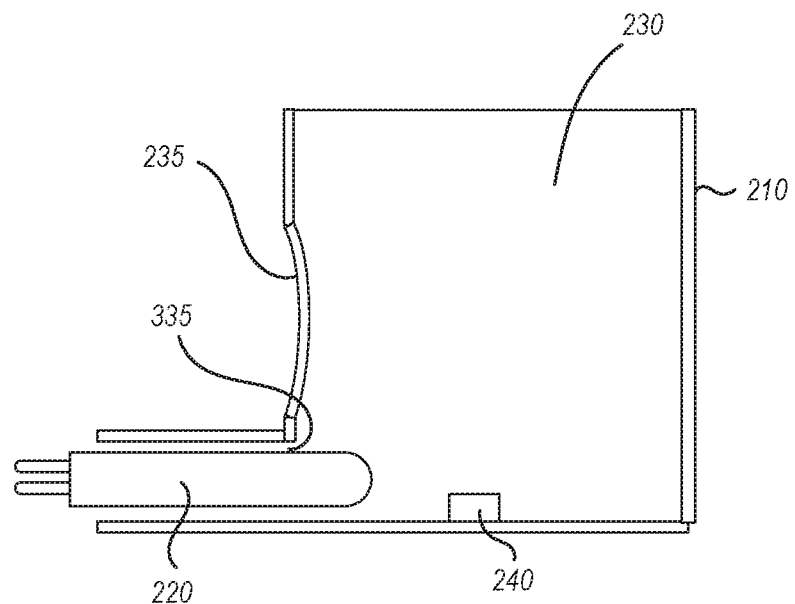
FIG. 4 illustrates a cross-sectional view of an embodiment of a firepot with a heating element extending therein according to the present disclosure.
Figure 5:
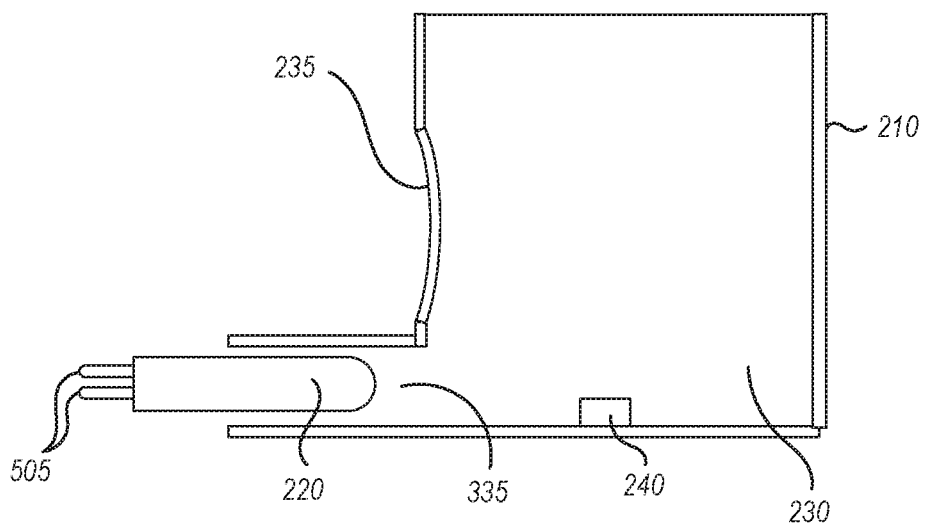
FIG. 5 illustrates a cross-sectional view of an embodiment of a firepot with a non-contact heating element according to the present disclosure.

Along these lines, FIGS. 4 and 5 illustrate various embodiments of a heating element disposed at, within, or near the interior space 230 of a firepot 210. For example, FIG. 4 illustrates a cross-sectional view of an embodiment of a firepot 210 with a heating element 220 extending therein. In one or more embodiments, the heating element 220 extends into the firepot 210 to make direct contact with the fuel 310 residing within the interior space 230 firepot 210, as shown in FIG. 3 and noted above. In this embodiment, the heating element 220 can ignite the fuel 310 within the interior space 230 of the firepot 210 through conductive heat transfer between the fuel 310 and the heating element 220.

Additionally, or alternatively, the blower 215 can blow air 330 over the heating element 220 and through the opening 235 into the interior space 230 of the firepot 210 to ignite the fuel 310 through convective heat transfer. For example, FIG. 5 shows an alternative embodiment of a heating element 220 and firepot 210 configured so that the heating element 220 does not make contact with the fuel 310.

In such an embodiment, the heating element 220 does not extend into the interior space 230 of the firepot 210. Accordingly, the heating element 220 does not ignite the fuel 310 in the firepot 210 through direct contact. Rather, in this non-contact configuration, the blower 215 blows air 330 over the heating element 220 and through the opening 235 into the interior space 230 of the firepot 210 to ignite the fuel 310 through convective heat transfer only.

In one or more embodiments, the heating element 220 can comprise ceramic material and two or more electrical leads 505. In particular, a manufacturer can connect the direct-current power source 325 to the electrical leads 505 of the heating element 220 and provide the heating element 220 with electrical power. The power source 325 passes current through the heating element 220 and the electrical resistance of the heating element 220 causes the ceramic material to heat up.

One advantage of ceramic material is that ceramics can change temperature at a faster rate than some other materials used in heating elements of the prior art. Also, ceramic material is durable and more corrosion resistant than heating elements of other materials found in the prior art, such as metal.

It will be appreciated, however, that in one or more embodiments of the present disclosure, the heating element 220 can comprise materials other than ceramic materials. For example, the heating element 220 can comprise a stainless-steel heating element or heating elements comprised of other heat-conducting materials. A heating element 220 can include a stainless-steel heating element for ignition of fuel 310 in the firepot 210 through conductive heat transfer, as described above. Also, heating element can comprise a ceramic heating element for ignition of fuel 310 in the firepot 210 through conductive heat transfer, convective heat transfer, or both, as described above.

Using the components of the auger feeder system 200, firepot 210, and heating element 220 described herein, a user can adjust the temperature of the smoke 315 that heats and/or surrounds the grilling surface 305 in at least three ways. First, the user can adjust the electrical power provided to the heating element 220 to increase or decrease the temperature of the heating element 220. Second, the user can adjust the rate of airflow provide by the blower 215, which passes over the heating element 220 and into the interior space 230 of the firepot 210. Third, the user can adjust the rate at which the auger 205 feeds fuel 310 into the interior space 230 of the firepot 210.

Any of the three foregoing adjustment methods results in an adjustment of the rate and/or amount of fuel 310 igniting within the firepot 210. The amount and rate at which fuel 310 is ignited and oxygen is provided results in an adjustment of smoke temperature by controlling which stage of burning occurs. Igniting the fuel 310 too much or too hot, or providing too much oxygen to the fuel 310, may result in the fuel 310 burning in a continuous combustion in Stage 3. In contrast, intermittently igniting fuel 310 within the firepot 210, in combination with intermittent increases and decreases in the amount of oxygen circulated into the firepot 210 by the blower 215, may maintain smoldering of the fuel 310 in Stage 2 of burning. The three adjustment methods described above also affect the smoke production efficiency and the amount of smoke produced by the combusting fuel 310.

For example, a hot flame produced by continuous combustion of fuel 310, including autoignition in Stage 3 of burning, produces less smoke 315 per amount of fuel 310. The smoke produced from such a hot flame will also have an increased smoke temperature. For smoking food within the grilling device 100 shown, this high temperature smoke can often be undesirable. However, a user may desire high temperature smoke for searing some foods.

Alternatively, a cold smoke produced from smoldering of the fuel 310 prior to Stage 3 of burning results in highly efficient smoke production and preferable smoke flavors transferred to the food. For example, a cold smoke can be produced from a smolder based on intermittent ignition of the fuel source as well as intermittent increases and decreases in oxygen supplied by the blower 215 to a subset of fuel 310 inside the firepot 210. This contrasts with autoignition that may result in a continuously combusting fuel source, such as a large, hot flame. Cold smoke produced in accordance with implementations of the present invention can be produced at a greater volume per amount of fuel 310 spent than a conventional, hot smoke.

In at least one embodiment, cold smoke produced from fuel smoldering prior to Stage 3 burning is less than 150° F. For example, in one or more embodiments, cold smoke may be less than 120° F., 100° F., 90° F., 80° F., or preferably less than 70° F.

Accordingly, it is important for the auger feeder system 200, heating element 220, blower 215, and related adjustment systems, including the temperature control systems described herein, to enable the user to quickly, precisely, and reliably generate a desired amount of smoke at a desired temperature for a desired period of time. For example, in one or more embodiments, the control systems of grilling devices described herein may sustain a smoldering of fuel 310 within the firepot 210 for at least five-minutes. In one or more other embodiments, smoldering may be sustained for at least ten-minutes, fifteen-minutes, or twenty-minutes. In addition, in some circumstances, the user may want to change the temperature and amount of smoke produced over time.

For example, when cooking one type of food, the user may want to avoid producing a hot flame and hot smoke at first, but then increase the temperature of the grilling surface 305 toward the end of the cooking time to sear the food product. Alternatively, while preparing another type of food, the user may want a high temperature at first to sear the food product and then decrease the temperature of the smoke produced over time. These various smoke temperature settings and adjustments over time, are referred to herein as "grilling modes." Various grilling modes described herein may comprise constant smoke temperatures, hot or cold, and/or varied temperatures over time.

Figure 6:
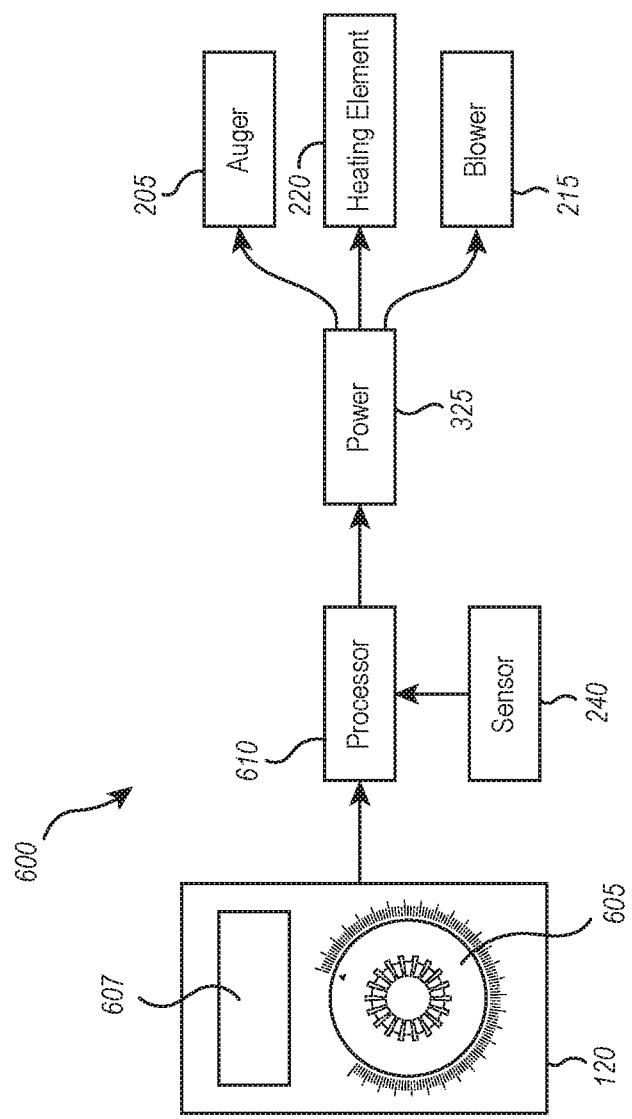
FIG. 6 shows a schematic representation of an embodiment of a temperature control system of a grilling device according to the present disclosure.

FIGS. 6-9 illustrate various embodiments of temperature control systems and methods that utilize the components of the grilling device 100 described herein to achieve various grilling modes quickly and accurately. The user can select or adjust the grilling mode of the grilling device 100 by inputting commands into a user control interface 120. In this vein, FIG. 6 illustrates an embodiment of a user control interface 120 that includes a temperature adjustment knob 605 and a display screen 607 The display screen 607 can display information to the user, such as, but not limited to, a set temperature of the grill, an actual temperature of the grill, elapsed time, or any other information that aids the user in cooking food in the grilling device 100.

One will appreciate that other implementations of a user control interface 120 can include more than one display screen 607 or no display screens 607 as well as any number and combination of buttons, knobs, switches, and the like, that a user can use to adjust the temperature of the grilling device 100. The user control interface 120 illustrated in FIG. 6 is shown only as a representation of a control system interface. One or more embodiments may include other configurations of user control interface 120. For example, one or more embodiments of the user control interface 120 may include digital temperature indicators, touch screen buttons, and customizable, pre-set, and/or programmable grilling modes options.

According to the embodiment of the temperature control system 600 illustrated in FIG. 6, once the user selects or sets a grilling mode using the user control interface 120, a processor 610 directs the power supply to feed electrical power to various components of the grilling device 100. For example, the processor 610 may increase current to the auger 205, causing the auger 205 to rotate faster and increase the rate at which fuel is fed into the firepot 210. Additionally, or alternatively, the processor 610 may increase power to the blower 215 to increase oxygen within the firepot and thus increase a rate of combustion of the fuel 310. Also, the processor 610 can adjust power to the heating element 220 either separately or in conjunction with power adjustments to the auger 205 and blower 215.

The processor receives feedback information and adjusts power output to the auger 205, heating element 220, and blower 215 accordingly to maintain or adjust smoke temperatures as dictated by the selected grilling mode. In one or more embodiments, a temperature sensor 240 provides this feedback information to the processor 610. For example, as the fuel 310 combusts within the interior space 230 of the firepot 210, the temperature sensors 240 relay temperature information back to the processor 610.

For example, if the temperature is too high, the processor can reduce power output to the heating element 220 to slow ignition, decrease power output to the blower 215 to decrease combustion, and/or decrease power output to the auger 205 to slow down the rate of fuel 310 being fed into the firepot 210.

Additionally, or alternatively, in at least one embodiment, the processor can increase power output to the auger 205 to increase the rate of fuel 310 being fed into the firepot 210. In such an embodiment, adding enough additional fuel 310, such as wood pellets, on top of other wood pellets already combusting in the firepot 210 smothers the combusting fuel 310. This smothering reduces oxygen supplied to the combusting fuel 310 so that the fuel 310 does not enter Stage 3 of burning.

Conversely, if the temperature is too low, the processor can increase power output to the heating element 220 to speed ignition, increase power output to the blower 215 to increase combustion, and/or increase power output to the auger 205 to increase the rate of fuel 310 being fed into the firepot 210. Increasing the rate of fuel 310 being fed into the firepot 210 may increase combustion and temperatures by providing more fuel 310 as long as not too much fuel 310 is added to result in smothering, as discussed above.

In this way, based on the feedback information provided by the temperature sensor 240, the temperature control system 600 maintains ideal environmental conditions within the firepot 210 to achieve the cold smoke produced between Stages 2 and 3 of burning, as discussed above. That is, controlling the heating element 220, blower 215, and auger 205 in combination, based on feedback information from the temperature sensor 240, causes a subset of fuel 310 such as wood pellets within the firepot 210 to smolder, while avoiding autoignition of the rest of the fuel 310.

In this way, the processor and feedback information from the one or more temperature sensors 240 can act together as part of a control system feedback loop, based on basic proportional, integral, and derivative control system principles. Thus, the embodiment of a temperature control system 600 shown in FIG. 6 enables a user to quickly and accurately achieve, maintain, and adjust smoke temperatures within the grilling device 100.

Along these lines, as noted above, the one or more temperature sensors 240 described herein are disposed within or near the interior space 230 of the firepot 210. Because the temperature sensors 240 are thus disposed, the feedback temperature provided to the processor 610 includes firepot temperature information as detected within the interior space 230 of the firepot 210. One will appreciate that the type of feedback information provided by the one or more temperature sensors 240 to the processor 610 depends on the location of the one or more temperature sensors 240.

For example, in one or more embodiments, the grilling device 100 may include one or more temperature sensors 240 disposed outside the interior space 230 of the firepot 210. For example, in one or more embodiments, the grilling device 100 may include one or more temperature sensors 240 disposed above the firepot 210, above the grilling surface 305, and/or within the warming/cooking chamber 105 above the food being prepared on the grilling surface 305. In an embodiment where one or more temperature sensors 240 are disposed within the warming/cooking chamber 105, for example, the feedback information relayed back to the processor 610 would include smoke temperature information from smoke inside the warming/cooking chamber 105 of the grilling device 100.

Generally, temperature control systems that rely only on feedback information from temperature sensors 240 disposed in the warming/cooking chamber 105 have long pre-heat times. This is because by the time smoke in the warming/cooking chamber 105 reaches the desired temperature, and that information is relayed back to the processor 610, the fuel 310 combusting within the firepot 210 may be self-sustaining and have already created an unwanted flame before the processor 610 can reduce power to heating element 220 or various other components. As a result, the hot flame will continue to increase the temperature of the warming/cooking chamber 105 until the fuel 310 is further spent due to continuous combustion in the Stage 3 of burning, even if the heating element 220, blower 215, and auger 205 have been shut off or slowed.

This lag-time between the combustion of fuel 310 and temperature of the smoke within the warming/cooking chamber 105 causes increased pre-heating times. For example, even if the processor 610 stops the auger 205 from feeding fuel 310 into the firepot 210 completely, the existing fuel takes time to burn down to a smolder and the desired amount of smoke and lower temperature level is achieved by the temperature control system 600.

In order to reduce pre-heating times, as noted above, one or more of the temperature sensors 240 are disposed at or near the interior space 230 of the firepot 210. In this way, the temperature sensors 240 provide feedback information to the processor regarding the temperature inside the firepot 210, rather than just the smoke temperature within the warming/cooking chamber 105. As such, if a flame is formed from self-sustained, runaway combustion of fuel 310 within the interior space 230 of the firepot 210, the temperature sensor 240 therein can relay this information back to the processor 610 before combustion becomes continuous.

Accordingly, in at least one embodiment having one or more temperature sensors 240 within, at, or near the interior space 230 of the firepot 210, the processor 610 does not need to wait until smoke within the warming/cooking chamber 105 reaches a desired temperature to adjust power output to the auger 205 and other components of the grilling device 100. Instead, the flame can be detected as it forms within the firepot 210 and the processor can prevent runaway combustion by reducing power output to the heating element 220, blower 215, auger 205, or other components.

This increased reaction time of the temperature control system 600, due to the placement of one or more temperature sensors 240 within or near the interior space 230 of the firepot 210, decreases an overshoot of the desired smoke temperature dictated by the grilling mode. Decreasing or even avoiding an overshoot in smoke temperature within the grilling device 100 eliminates the need to wait for fuel to burn down in order to readjust to the desired smoke temperature. Thus, pre-heating times are reduced by the one or more temperature sensors 240 disposed at, near, or within the interior space 230 of the firepot 210.

This reduced pre-heating time is especially advantageous when the grilling mode selected by the user includes cold smoke grilling modes. As noted above, "cold smoke," as used herein, refers to smoke produced from smoldering fuel 310, such as by intermittently igniting the fuel source in such a way as to avoid self-sustained combustion. In particular, "smoldering," as used herein, refers to the combustion of fuel 310 without a flame. Smoldering can be considered a low-efficiency burn that produces a large amount of smoke, or high-efficiency smoke production. Smoke produced from smoldering fuel 310 is generally colder than smoke produced from a hot flame. Colder smoke often provides a preferable taste and can transfer flavors more favorably to the food being prepare within the warming/cooking chamber 105.

For example, in one or more embodiments, cold smoke produced from fuel smoldering prior to Stage 3 burning is less than 150° F. In one or more other embodiments, cold smoke may be less than 120° F., 100° F., 90° F., 80° F., or preferably less than 70° F.

In order to quickly produce a cold smoke resulting from a smolder, it is necessary to avoid/eliminate flames forming from the continuous combustion and autoignition of fuel 310. As noted above, the various embodiments of temperature control system 600 and temperature sensor 240 configurations described herein can reduce the pre-heat time necessary to form a smolder and avoid a hot flame within the interior space 230 of the firepot 210.

Accordingly, the various embodiments of the temperature control system 600, along with various components of the grilling device 100, including the one or more temperature sensors 240 disposed within, at, or near the interior space 230 of the firepot 210, can achieve a cold smoke produced by smoldering fuel in less than 10 minutes. In one or more embodiments, the pre-heat time for such a cold smoke grilling mode may be less than 9 minutes, less than 8 minutes, or less than 7 minutes. In one or more embodiments, the pre-heat time for such a cold smoke grilling mode may be less than 6 minutes, less than 5 minutes, and preferably less than 4 minutes.

Figure 7A:
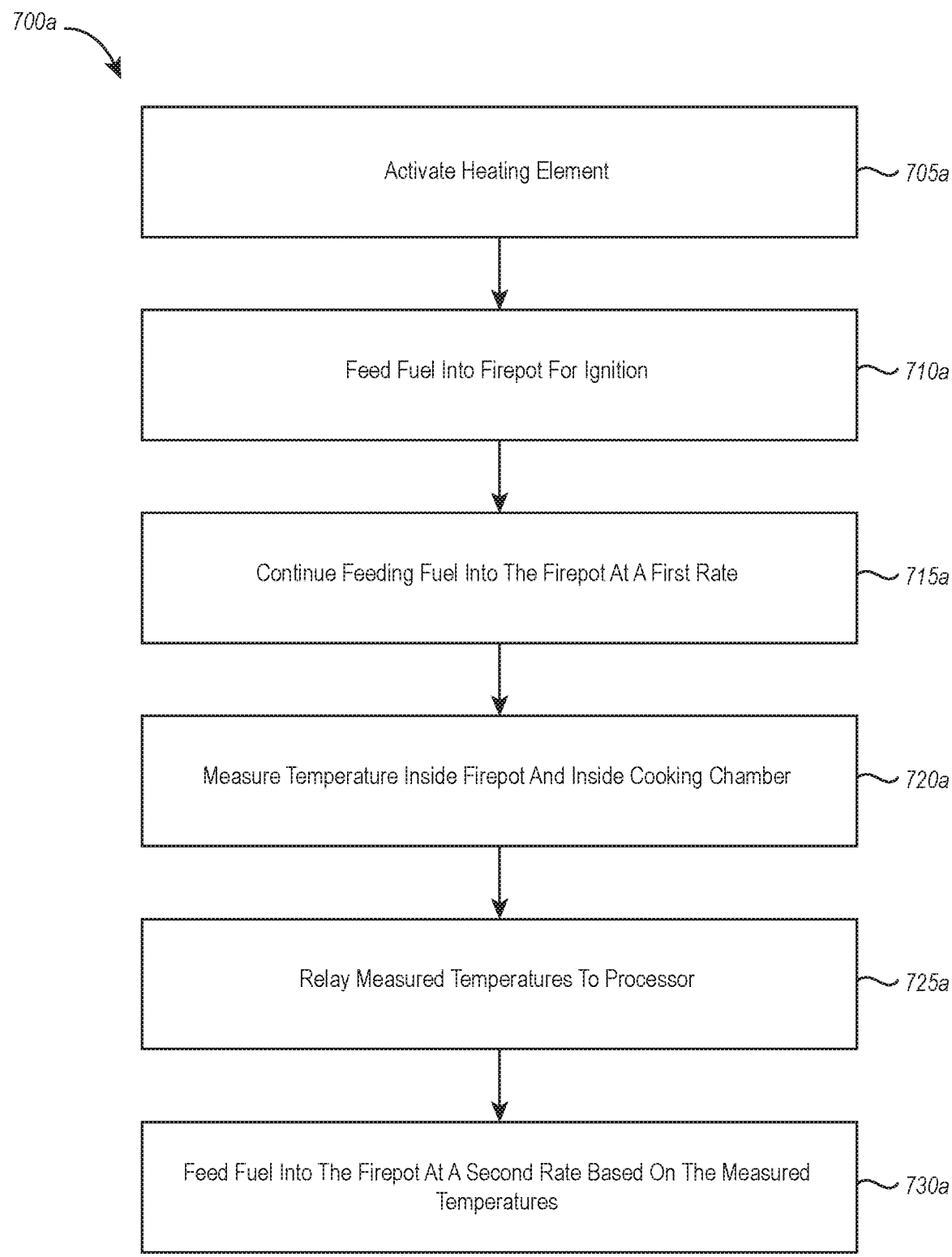
FIG. 7A shows a flowchart outlining an embodiment of a method of quickly achieving a cold smoke grilling mode for cooking food within a grilling device according to the present disclosure.

To further clarify the temperature control system 600 illustrated in FIG. 6, FIG. 7A shows a flow-chart representation of a method 700a of controlling the smoke temperature of a grilling device 100 according to the temperature control system 600 of FIG. 6. A first step 705a can include activating a heating element. For example, the heating element 220 is depicted in FIGS. 2-5.

A second step 710a of the method 700a can include feeding fuel into a firepot and providing oxygen to the fuel to ignite the fuel with the activated heating element. For example, this step is depicted in FIG. 3 and described above.

A third step 715a can include activating a blower to provide oxygen to fuel inside the firepot and continuing to feed the fuel into the firepot at a first rate. A fourth step 720a can include measuring the temperature inside the firepot and inside the cooking chamber. This fourth step is depicted by the temperature sensors 240, 242 illustrated in FIG. 3.

A fifth step 725a can include relaying the measured temperatures to a processor. A sixth step 730a can include feeding fuel into the firepot at a second rate based on the measured temperatures. Additionally, or alternatively, at least one embodiment of the method 700a includes adjusting power to the heating element and/or blower to control the rate of ignition and combustion based on the measured temperatures inside the firepot and cooking chamber.

For example, in order to ignite fuel 310 inside the firepot 210, as depicted in FIG. 3, the heating element 220 may be heated to 700-degrees or hotter. At such temperatures, fuel 310 contacting the heating element 220 ignite and combust, and may even char in Stage 3 of burning as described above. However, the amount of individual fuel pellets combusting at one time can be limited by reducing the rate at which fuel 310 is fed into the firepot 210, as described above.

For example, in at least one embodiment, once the heating element 220 activates, the rotation of the auger 205 may be slowed to provide only one, two, or three pellets inside the firepot 210 at a time. In at least one embodiment, more than three pellets, including four pellets or between five and ten pellets are provided at any one time for combustion inside the firepot 210. The small amount of fuel 310 inside the firepot combusts to form smoke, as described herein, but is not enough to cause the temperature in the warming/cooking chamber 105 to rise above cold smoke temperatures described herein.

Conversely, as noted above, the rotation of the auger 205 may also be increased to feed enough fuel 310 into the firepot 210 to smother the fuel 310 already combusting therein.

In one or more embodiments of the method 700a illustrated in FIG. 7A, the temperature information obtained from the heating element includes the temperature within the interior space 230 of the firepot 210. Additionally, as noted above, one or more embodiments of the method 700a also includes measuring temperature information, such as smoke temperature information from the warming/cooking chamber 105. Accordingly, in such an embodiment, adjusting power output to the heating element and blower, or adjusting the second rate at which fuel is fed into the firepot in the sixth step 730a, can also be based on the smoke temperature inside the warming/cooking chamber 105.

For example, as discussed above, temperature feedback information obtained from within the interior space of the firepot 210 may minimize control system overshoot and reduce pre-heat times. However, any control system is prone to some overshoot, even if minor. Obtaining feedback information from various additional sources, for example from within the warming/cooking chamber 105, provides additional data to the control system. This additional information can improve the reaction time of the control system, which may result in a quicker adjustment of the power to the heating element 220, blower 215, or the second rate at which fuel is fed into the firepot 210.

For example, if the temperature information obtained from within the firepot 210 indicates a flame that is too hot, the control system will stop feeding power to the heating element 220, blower 215, and/or reduce the second rate of fuel being fed into the firepot 210. However, reduction of the flame based on this single source of information may cause the smoke temperature in the warming/cooking chamber 105 to drop below the desired level before the blower 215 increases air circulation or second rate of fuel is adjusted again to increase the temperature in the firepot back up to the desired level.

However, if smoke temperature from within the cooking/warming chamber reaches the desired temperature before the temperature of the heating element 220, amount of air circulated by the blower 215, or the second rate of fuel being fed into the firepot 210 dips too low, these can be increased based on the smoke temperature information within the warming/cooking chamber 105. In this way, the control system can react to both smoke temperature and firepot temperature and decrease overshoot, which decreases pre-heat time. This also enables the system to maintain a smolder of the fuel 310 inside the firepot 210 by eliminating overshoot into the third stage of burning, thus avoiding combustion.

Additionally, or alternatively, the smoke temperature obtained within the warming/cooking chamber 105 can be displayed to the user. Thus, this information can also be used to inform the user of the actual temperature within the warming/cooking chamber 105 of the grilling device 100.

Also, in one or more embodiments, the method 700a may include adjusting power input to a blower and/or heating element, as described above, after temperature information is relayed to the processor. In such an embodiment, the processor can adjust the power input to the blower and/or heating element to adjust smoke temperature and reduce flames from combustion as described above. Further, in such an embodiment, the power provided to the blower and/or heating element can be done independently or in conjunction with one another. Also, such adjustments of power provided to the blower and/or heating element can be done together with, or independently of, sixth step 730a of feeding fuel into the firepot at a second rate.

Figure 7B:
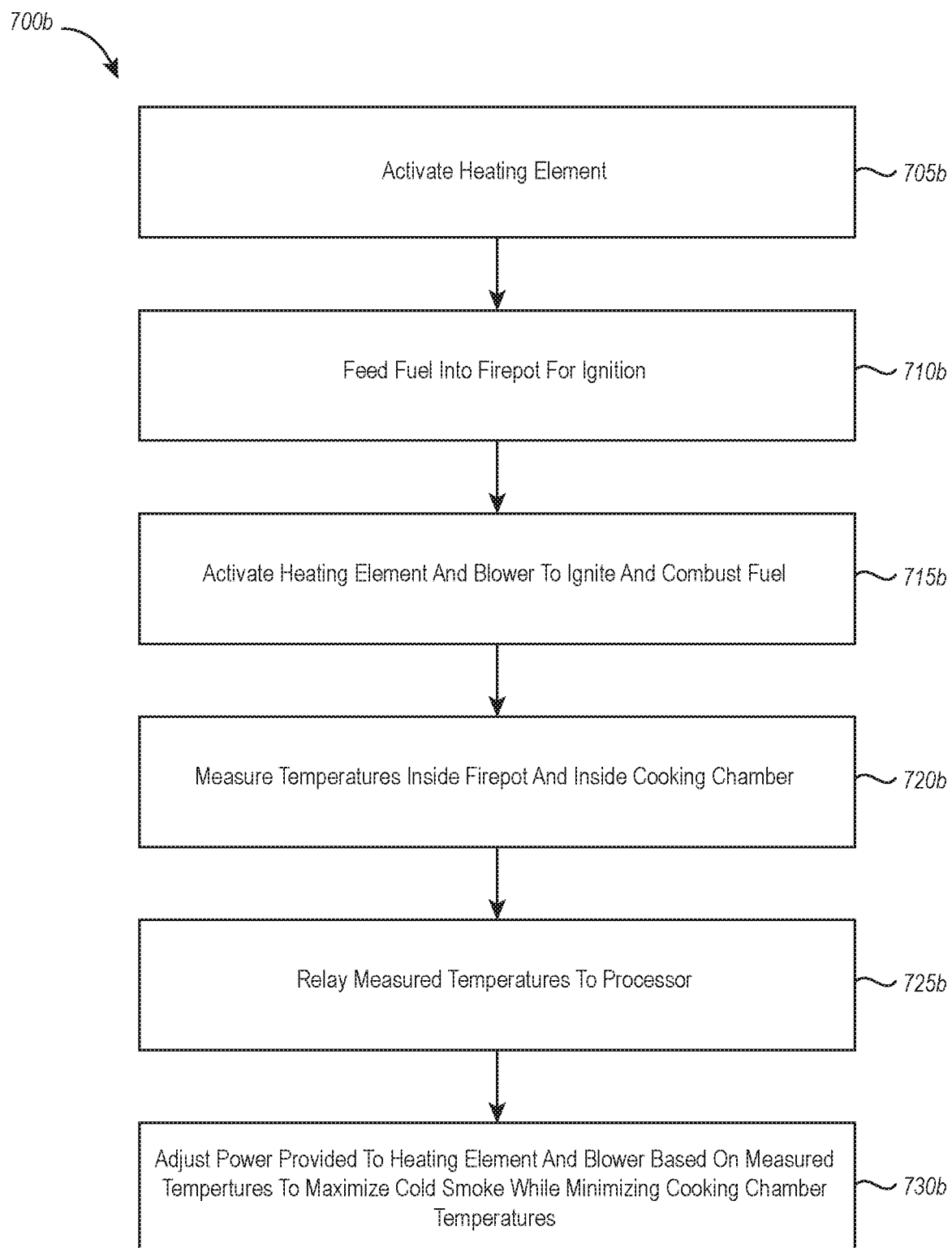
FIG. 7B shows a flowchart outlining an embodiment of a method of quickly achieving a cold smoke grilling mode for cooking food within a grilling device according to the present disclosure.

Along these lines, FIG. 7B shows a flow-chart representation of a method 700b of controlling the smoke temperature of a grilling device 100 according to the temperature control system 600 of FIG. 6. In at least one embodiment, the first step 705b of the method 700b includes activating a heating element. This heating element 220 is depicted, for example, in FIGS. 2-5.

In at least one embodiment, the method 700b includes a second step 710b of feeding fuel into a firepot for ignition. This step is depicted, for example, in FIG. 3.

In at least one embodiment of the method 700b, a third step 715b includes activating the heating element and a blower to ignite and combust the fuel inside the firepot. The blower and heating element activated in this third step 715b are depicted in FIGS. 2-5.

In at least one embodiment of the method 700b, a fourth step 720b includes measuring temperatures inside the firepot and inside a cooking chamber. The temperature inside the firepot can be measured by the temperature sensors 240, 240a, 240b disposed inside the firepot, as depicted in FIGS. 2 and 3. The temperature of smoke inside the warming/cooking chamber 105 can be measured by temperature sensors 242 inside the warming/cooking chamber 105, as depicted in FIG. 3.

In at least one embodiment, the fifth step 725b of the method 700b includes relaying the measured temperatures to a processor. Such a processor is depicted in FIG. 6 and described above.

In at least one embodiment of the method 700b, a sixth step 730b includes adjusting the amount of power provided to the heating element and blower based on the measured temperatures inside the firepot and cooking chamber. The power source 325 depicted in FIG. 3 is wired to the blower 215 and heating element 220. In at least one embodiment, the processor depicted in FIG. 6 regulates the power output of the power source 325 to the various components.

As noted in sixth step 730b of FIG. 7B, adjusting power to the blower 215 and heating element 220 maximizes cold smoke while minimizing temperatures in the warming/cooking chamber 105 as described herein. For example, the blower 215 and heating element 220 are regulated to create temperatures that break down lignin in the fuel 310 while avoiding continuous combustion due to autoignition of surrounding fuel 310.

Additionally, in at least one embodiment of the methods 700a, 700b described herein, cold smoke is maximized while minimizing the temperature in the warming/cooking chamber 105 by combining the adjustment of the rate of fuel 310 being fed into the firepot 210, as described in the method 700a depicted in FIG. 7A, with the adjustment of power provided to the heating element 220 and blower 215, as described in the method 700b depicted in FIG. 7B.

Figure 8:
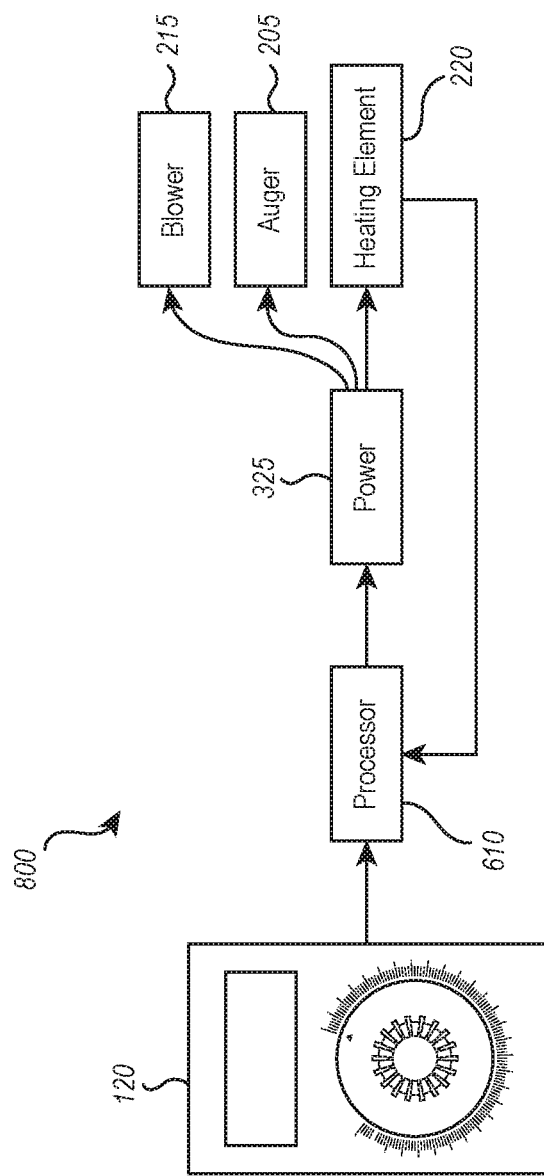
FIG. 8 shows a schematic representation of an embodiment of a temperature control system of a grilling device according to the present disclosure.

FIG. 8 also illustrates an embodiment of a temperature control system 800. In the illustrated embodiment of FIG. 8, the temperature control system 800 includes a user control interface 120, processor 610, power source 325, heating element 220, auger 205, and blower 215. One will note that the temperature control system 800 illustrated in FIG. 8 does not include a sensor, as does the temperature control system 600 illustrated in FIG. 6.

Rather, in one or more embodiments, such as that shown in FIG. 8, the heating element 220 of the temperature control system 800 can act as a temperature sensor. For example, in one or more embodiments, the processor 610 can reduce electric current provided to the heating element 220 from the power source 325. This reduced current provided to the heating element 220 deactivates the heating element so that it is no longer igniting fuel 310 combustion within the interior space 230 of the firepot 210.

Rather, when the processor 610 reduces the electrical power provided to the heating element 220, the heat produced by combusting fuel within the interior space 230 of the firepot 210 affects the resistance of the heating element 220. The resistance of the heating element 220 is a function of the temperature of the heating element 220 itself.

Therefore, a change in temperature within the interior space 230 of the firepot 210 will accordingly change the resistance of the heating element 220. These principles are the same principles by which resistance temperature detectors known as "RTDs" operate. The resistance of the heating element 220 can be measured and relayed back to the processor 610. In one or more embodiments, for example, an ohmmeter may be used to measure the resistance of the heating element 220.

In turn, the processor 610 can convert/calculate the temperature within the firepot 210 from the electrical current provided to the heating element 220 and the resistance measured between electrical leads of the heating element 220.

Depending on the configuration of the heating element 220, various modalities can be used to use the heating element 220 as a heat sensor. For example, in one or more embodiments, as the temperature of the heating element 220 increases, the resistance of the heating elements of the heating element 220 will also increase. In such embodiments, a resistance sensor, such as an ohmmeter, (not shown) may be used to measure the resistance of the heating element 220. This resistance measurement can be converted directly to a temperature by the processor 610.

In general, the temperature of the heating element 220 will typically correspond to a resistance of the heating element 220. This temperature may be determined by calculation using the resistance as a factor. Alternatively, or additionally, one or more embodiments may include a look-up table in the processor 610 that correlates resistance of the heating element 220 with temperatures.

In addition, in one or more embodiments, the heating element 220 may include a thermocouple. A thermocouple can produce a small voltage, which can be relayed back to the processor 610. The voltage can be used to determine the temperature of the heating element 220. Note that in such an embodiment, current can be applied to the heating element 220 to heat the heating element 220 while the temperature is being measured by the thermocouple.

In one or more embodiments, the current flowing through the heating element 220 can be measured, as well as the voltage across electrical leads of the heating element 220 as the heating element 220 is actively being used to ignite fuel 310 within the firepot 210. Knowing the voltage and current being supplied to the heating element 220 by the power source 325 allows for a determination by the processor 610 of the resistance of the heating element 220. As noted above, resistance of the heating element 220 can be correlated to temperature of the heating element, which can be correlated to the temperature of the firepot 210.

Thus, as shown in FIG. 8, one or more embodiments of a temperature control system 800 can use the heating element 220 itself as a temperature sensor to reduce pre-heat times of the grilling device 100 and precisely maintain smoldering fuel 310 to produce cold smoke for extended periods of time, as noted above. In such an embodiment, no other separate temperature sensors 240 may be included. However, one or more embodiments where the heating element 220 is also a temperature sensor may also include one or more other temperature sensors 240 disposed within and/or outside the interior space 230 of the firepot 210. For example, one or more other temperature sensors 240 may be disposed above the grilling surface 305 and/or within the warming/cooking chamber 105 of the grilling device 100.

In such embodiments, the processor 610 can adjust power input to the various components of the grilling device 100 based at least partially on temperature information from both the heating element 220 and the one or more other temperature sensors 240.

Figure 9:
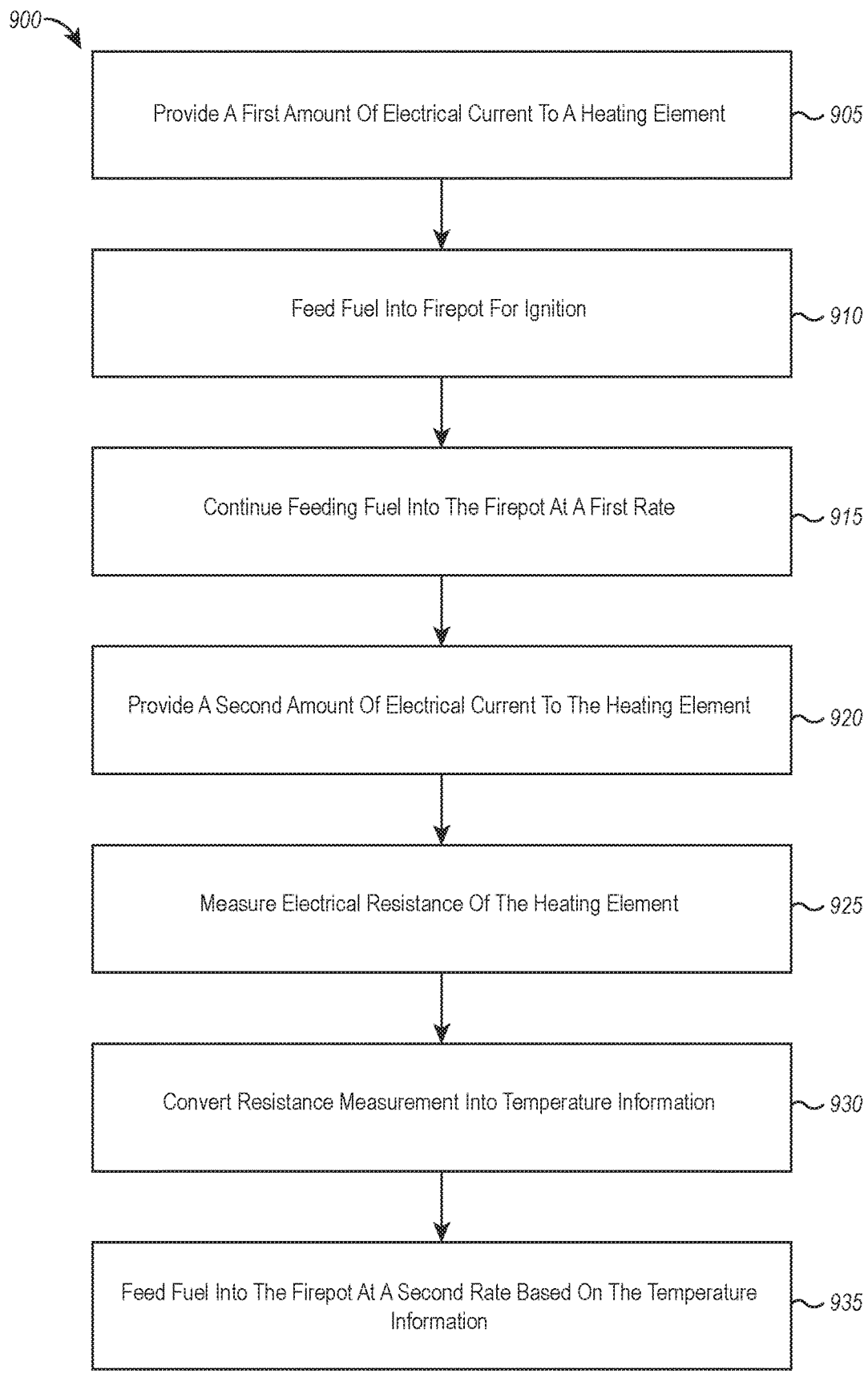
FIG. 9 shows a flowchart outlining an embodiment of a method of quickly achieving a cold smoke grilling mode for cooking food within a grilling device according to the present disclosure.

To further clarify the temperature control system 800 illustrated in FIG. 8, FIG. 9 shows a flow-chart representation of a method 900 of controlling the smoke temperature of a grilling device 100 according to the temperature control system 800 of FIG. 8. A first step 905 of the method 900 can include activating a heating element by providing a first amount of electrical power to the heating element. A second step 910 can include feeding fuel into a firepot to ignite the fuel with the activated heating element.

Next, a third step 915 can include continuing to feed the fuel into the firepot at a first rate. A fourth step 920 can include deactivating the heating element by providing a second amount of electrical power to the heating element. In one or more embodiments, the second amount of electrical power is less than the first amount of electrical power supplied in the first step 905. A fifth step 925 can include measuring the electrical resistance of the heating element. A sixth step 930 can include converting the resistance measurement into temperature information.

Last, a seventh step 935 can include feeding the fuel into the firepot at a second rate, adjusting power output to the heating element 220, and/or adjusting power output to the blower 215, based on the temperature information to maintain the production of cold smoke for an extended period of time. The extended period of time may be greater than 5-minutes, 10-minutes, 15-minutes, or preferably greater than 20-minutes.

In one or more embodiments of the method 900 illustrated in FIG. 9, the temperature information obtained from the heating element includes the temperature within the interior space 230 of the firepot 210. Additionally, one or more embodiments of the method 900 may also include measuring temperature information, such as smoke temperature information from the warming/cooking chamber 105. Accordingly, in such an embodiment, the second rate at which fuel is fed into the firepot or controlling power to the heating element in the seventh step 935 can also be based on the smoke temperature information.

Also, in one or more embodiments, the method 900 may include adjusting power input to a blower and/or heating element, as described above, after temperature information is measured. In such an embodiment, the processor can adjust the power input to the blower and/or heating element to adjust smoke temperature and avoid burning fuel in the third stage of burning, as described above. Further, in such an embodiment, the power provided to the blower and/or heating element can be done independently or in conjunction with one another. Also, such adjustments of power provided to the blower and/or heating element can be done together with, or independently of, seventh step 935 of feeding fuel into the firepot at a second rate.

Accordingly, the various embodiments of the temperature control system 800 and method 900 described in FIGS. 8 and 9, respectively, along with various components of the grilling device 100, including the heating element 220 being used as a temperature sensor, can achieve a cold smoke produced by smoldering fuel in less than 10 minutes. In one or more embodiments, the pre-heat time for such a cold smoke grilling mode may be less than 9 minutes, less than 8 minutes, or less than 7 minutes. In one or more embodiments, the pre-heat time for such a cold smoke grilling mode may be less than 6 minutes, less than 5 minutes, and preferably less than 4 minutes.

In addition, any of the embodiments of temperature control systems and components described herein can accurately achieve any number of grilling modes selected by a user. Such grilling modes may include cold smoke grilling modes, as described above. Other grilling modes may include hot smoke grilling modes generated from flames produced by the combustion of fuel in the third stage of burning. Yet other grilling modes may comprise a number of different smoke temperatures and transitions between smoke temperatures over time.

For example, in one or more embodiments, a grilling mode may include an initial cold smoke temperature that transitions to a high smoke temperature over time, or vice versa. The temperature control systems and components described herein can quickly and accurately achieve and maintain various smoke temperatures, as selected by a user. In addition, the temperature control systems and components described herein can transition between multiple temperatures of a grilling mode at set rates and for set periods of time, as dictated by the user selected grilling mode.

In addition to the foregoing, one or more implementations of a grilling device 100 described herein may include additional features that increase ignition efficiency in the firepot and/or reduce preheat times. For example, one or more embodiments of grilling devices described herein may comprise a firepot having perforations and/or landing zones. To illustrate, FIG. 10 shows a perspective view of an embodiment of a firepot 1000.

Figure 10:
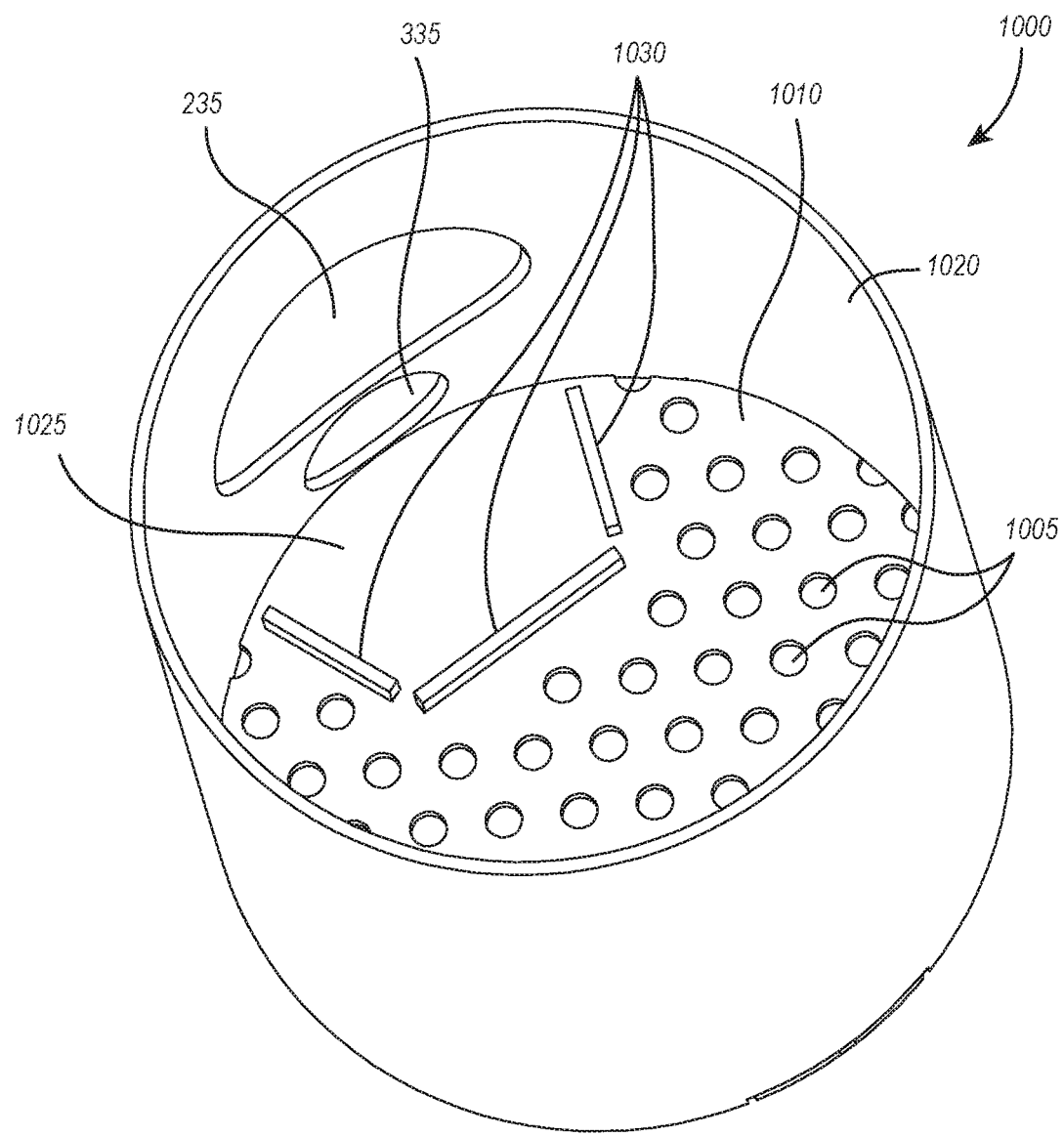
FIG. 10 illustrates a perspective view of an embodiment of a firepot having a perforated floor and a landing zone according to the present disclosure.
Figure 11:
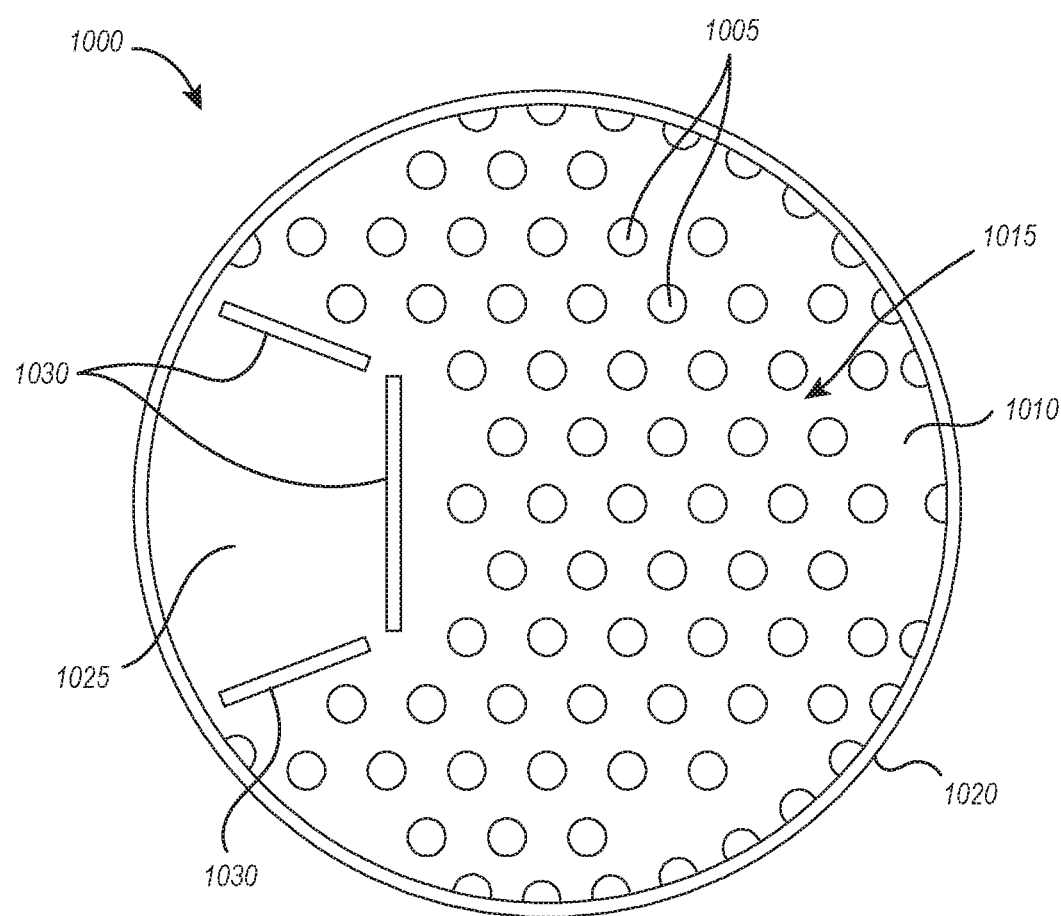
FIG. 11 illustrates a top view of the firepot illustrated in FIG. 10 according to the present disclosure.

In the illustrated embodiment of FIG. 10, a firepot 1000 includes a plurality of holes 1005 in the floor 1010. Along these lines, FIG. 11 illustrates a top view of the firepot 1000 illustrated in FIG. 10, and more clearly shows the holes 1005 in the floor 1010 of the firepot 1000. The plurality of holes 1005 in the floor 1010 forms a perforated floor 1015.

Regarding the perforated floor 1015, the number, size, and pattern of the holes 1005 in the perforated floor 1015 can vary. For example, in one or more embodiments, the perforated floor 1015 can include holes 1005 with a diameter of 1/32-inch or 1/16-inch. In one or more embodiments, the holes 1005 can be 1/8-inch. In yet another embodiment, a manufacturer can include holes 1005 with diameters of 1/4-inch. In yet another embodiment, the diameter of the holes may be greater than or equal to 1/3 or 1/2-inch. One or more embodiments can include a variety of different sized and shaped holes 1005 throughout the perforated floor 1015.

In addition, a manufacturer can randomly distribute holes in no particular order, or order a few or many holes into a particular pattern designed to optimize the ventilation of the firepot 1000. In such embodiments of a firepot 1000 with a perforated floor 1015, the holes 1005 allow air to enter the firepot 1000 to facilitate fuel ignition and burning. The holes 1005 can also allow ash to fall through the perforated floor 1015 of the firepot 1000, resulting in a clean firepot 1000 substantially free of ash, soot, and creosote.

While the bottom ventilation holes 1005 can facilitate ventilation and reduction of ash, soot, and creosote, they can also reduce the structural rigidity of the perforated floor 1015 if too much material is removed. Therefore, the number and size of the holes 1005 can vary between embodiments so long as the holes 1005 provide sufficient ventilation to the firepot 1000 without detrimentally decreasing the structural rigidity of the perforated floor 1015.

Additionally, or alternatively, a manufacturer can include ventilation holes 1005 in the sidewalls 1020 of the firepot 1000.

The embodiment of the firepot 1000 illustrated in FIGS. 10 and 11 also include a landing zone 1025. The landing zone 1025 includes a portion of the perforated floor 1015 nearest to the heating element opening 335 that does not have holes 1005. Because the holes 1005 of the perforated floor 1015 allow air through the floor 1010 of the firepot 1000, fuel 310 within the firepot 1000 may be moved around, circulated, or otherwise disturbed within the firepot 1000.

As such, the landing zone 1025 provides an area on the perforated floor 1015 where fuel 310 can accumulate in proximity to the heating element 220, without disturbance from the circulating air. In this way, the landing zone 1025 can facilitate quick and efficient ignition of the fuel 310 inside the firepot 210.

Additionally, or alternatively, the landing zone 1025 described above, can also include a raised perimeter 1030 that at least partially surrounds the landing zone 1025. In one or more embodiments, the raised perimeter 1030 can include one or more walls of material protruding up from the floor 1010 of the firepot 1000. In one or more embodiments, the raised perimeter 1030 extends at least partially around the landing zone 1025 between the landing zone 1025 and the holes 1005 in the remainder of the floor 1010.

Accordingly, the raised perimeter 1030 surrounding the landing zone 1025 can provide a barrier that causes fuel 310 to gather (or "clump") together on the landing zone 1025. The raised perimeter 1030 can thus ensure that proper ignition of the fuel 310 takes place before air circulating from the blower 215 causes the fuel 310 to blow away from the landing zone 1025.

In one or more embodiments, the raised perimeter 1030 of the landing zone 1025 can include a single wall extending entirely around the landing zone 1025 between the landing zone 1025 and the holes 1005. In one or more embodiments, the raised perimeter 1030 can include two or more separated sections of a raised wall. A manufacturer can dispose these sections around the perimeter of the landing zone 1025 at positions that most effectively prevent fuel 310 from blowing away from the landing zone 1025.

In such an embodiment, the separate raised wall sections may be the same height or various different heights. In addition, the height of the raised perimeter 1030 may vary in the various embodiments described herein. For example, in one embodiment, the height of the raised perimeter 1030 may be about 0.5 inches. In one embodiment, the raised perimeter 1030 may have a height of about 0.25 to 0.75 inches. In another embodiment, the height may be about 1 inch or 2 inches. In yet other embodiments, the height of the raised perimeter 1030 may be less than about 0.25 inches or greater than about 2 inches.

In one or more embodiments, a manufacturer can form at least the floor 1010 and/or sidewalls 1020 of the firepot 1000 using a mesh material, rather than a solid material with ventilation holes formed therethrough. The mesh material can be configured to allow a blower 215 to circulate air within the firepot 1000 and allow ash, soot and creosote to fall through the floor 1010 of the firepot 1000° F.

Test Results, Example 1

TABLE 1

| Event | Auger Speed | Power to Heating Element | Blower Setting | Status | Firepot Temp (F.) | Burning Stage | Cooking Chamber Temp |
|---|---|---|---|---|---|---|---|
| 1 | 10% | 10 W | 10% | No smoke formed | 200° F.-400° F. | Stage 1 | 37° F.-40° F. |
| 2 | 10% | 10 W | 10% |  | 800° F.-1000° F. | Stage 1 | 37° F.-40° F. |
| 3 | 10% | 10 W | 10% | Smoke Begins | 500° F.-750° F. | Stage2 | 37° F.-40° F. |

TABLE 1-continued

| Event | Auger Speed | Power to Heating Element | Blower Setting | Status | Firepot Temp (F.) | Burning Stage | Cooking Chamber Temp |
|---|---|---|---|---|---|---|---|
| 4 | 10% | 10 W | 10% | Pellets added, smoke drops | 225° F. | Stage 1 | 37° F.-40° F. |
| 5 | 10% | 10 W | 10% | Thin Smoke Begins | 330° F. | Stage 2-3 | 37° F.-40° F. |
| 6 | 10% | 10 W | 10% | Smoke Thickens Gradually | 370° F.-470° F. | Stage 2-3 | 37° F.-40° F. |
| 7 | 10% | 10 W | 10% | Smoke Steady | 400° F.-500° F. | Stage 2-3 | 37° F.-40° F. |
| 8 | 10% | 10 W | 10% | Fresh Pellets, Smoke is Steady | 300° F.-350° F. | Stage 2-3 | 37° F.-40° F. |
| 9 | 10% | 10 W | 10% | Thicker Smoke | 400° F.-700° F. | Stage 1-2 | 37° F.-40° F. |
| 10 | 10% | 10 W | 10% | Pellets added, smoke drops | 470° F.-600° F. | Stage 2-3 | 37° F.-40° F. |
| 11 | 10% | 10 W | 10% | Thicker Smoke | 700° F.-850° F. | Stage 3 | 37° F.-40° F. |
| 12 | 10% | 10 W | 10% | Autoignition of Pellets | 865° F. | Stage 4 | 100° F.-200° F. |

As seen in Table 1 above, 12 steps were performed in sequence, with each step having certain conditions, including auger speed, power to the heating element, and a blower setting. The conditions of each step produce a status within a grilling device, a temperature within the firepot, a certain stage of burning, and cooking chamber temperatures. As seen from the data of Table 1, fuel pellets can be added intermittently to produce smoke without increasing the temperature of the cooking chamber.

The temperature of the firepot increases and decreases throughout the test as pellets are added to increase combustion or smother existing fuel, but the temperature in the cooking chamber remains consistently low until event 12, where autoignition of the pellets produces a flame that increases the temperature of the cooking chamber. In this way, cold smoke as described herein is produced at low temperatures in the cooking chamber. Once pellets ignite to produce a flame, the fuel can be smothered, or other component power reduces, such as blower, auger, or heating element, to reduce the temperature and begin the cycle over at event 1 to continue producing cold smoke at low cooking chamber temperatures.

The foregoing test results shown in Table 1 illustrate one possible sequence for smoke formation and corresponding smoke status. Notably, the Stages (i.e., Stages 1-4 described herein) can alternate as fuel pellets are dropped into the firepot 210 from the auger 205. One will appreciate that various settings of the foregoing test results (e.g., blower speed, auger speed) can be adjusted to douse the firepot 210, or to increase the combustion efficiency of the fuel 310 in order to maximize decomposition of lignin (e.g., Events 9-10) while maintaining a relatively low air and smoke temperatures within the warming/cooking chamber 105.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Many computers are intended to be used by direct user interaction with the computer. As such, computers have input hardware and software user interfaces to facilitate user interaction. For example, a modern general-purpose computer may include a keyboard, mouse, touchpad, camera, etc., for allowing a user to input data into the computer. In addition, various software user interfaces may be available.

Examples of software user interfaces include graphical user interfaces, text command line-based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "MC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention can be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A grilling device, comprising:

an oven having a cooking chamber for cooking food;

an auger feeder system configured for delivering wood fuel;

a firepot connected to the auger feeder system, the firepot having an interior space configured to receive wood fuel dispensed by the auger feeder system;

a heating element configured to provide heat to the interior space of the firepot;

a blower configured to provide oxygen to the interior space of the firepot; and a digital controller;

wherein the digital controller is configured in connection with the heating element and the blower to intermittently ignite the wood fuel with the heating element to sustain a smoldering of wood fuel in the firepot such that combustion of the wood fuel is not self-sustaining without an external heat source and deliver smoke to the cooking chamber while maintaining a temperature in the cooking chamber at or below about 150° F. for at least 5 minutes.

2. The grilling device of claim 1, further comprising a temperature sensor positioned proximate one of the firepot or the cooking chamber.

3. The grilling device of claim 1, wherein the grilling device is configured to measure a property of the heating element to determine a temperature.

4. The grilling device of claim 3, further comprising an ohmmeter that measures an electrical resistance of the heating element.

5. The grilling device of claim 4, wherein feedback information provided to the digital controller comprises the electrical resistance measured by the ohmmeter.

6. The grilling device of claim 1, wherein the grilling device is configured to sustain a smoldering of wood fuel in the firepot by intermittently igniting the wood fuel in the firepot in combination with intermittent increases and decreases in oxygen supplied to the wood fuel in the firepot.

7. The grilling device of claim 1, wherein the grilling device is configured to maintain a smoldering of the wood fuel in the firepot for at least ten minutes.

8. The grilling device of claim 1, wherein the grilling device is configured to combust lignin in the firepot while maintaining a temperature within the cooking chamber of between about 70° F. to about 120° F. for a period of at least 5 minutes.

9. The grilling device of claim 1, further comprising a storage comprising computer-executable instructions that, when executed, cause the grilling device to perform the following steps:

ignite wood fuel within the interior space of the firepot by providing the heating element with a first amount of electrical power from a power source;

provide a second amount of electrical power to the heating element, the second amount of electrical power being less than the first amount of electrical power;

receive an electrical resistance signal from the heating element upon application of the second amount of electrical power to the heating element;

convert, at a processor, the electrical resistance signal to firepot temperature information; and adjust the electrical power provided to the heating element and blower based on the firepot temperature information, wherein the adjustment:

prevents the fuel from entering into a state of continuous combustion, and maintains a temperature within the cooking chamber of 150° F. or less for at least five-minutes.

10. The grilling device of claim 9, wherein the grilling device is further configured to:

identify a temperature within the cooking chamber of the grilling device; and send information regarding the temperature within the cooking chamber to the processor, wherein the processor adjusts the electrical power provided to the heating element and blower based at least in part on the information regarding the temperature in the cooking chamber, the cooking chamber comprising a space that is separate from the interior space of the firepot.

11. The grilling device of claim 10, wherein the grilling device is further configured to:

change a speed of the blower or an auger in response to the information regarding the temperature in the cooking chamber.

12. The grilling device of claim 9, wherein the grilling device is further configured to:

change a speed of the blower in response to the firepot temperature information.

13. The grilling device of claim 9, wherein the grilling device is further configured to:

change a speed of an auger in response to the firepot temperature information.

14. The grilling device of claim 9, wherein smoke from a smoldering of the wood fuel in the firepot is maintained at less than 100° F. for at least five-minutes.

15. The grilling device of claim 9, wherein smoke from a smoldering of the wood fuel in the firepot is maintained at less than 80° F. for at least five-minutes.

\* \* \* \* \*

UNITED STATES PATENT AND TRADEMARK OFFICE
CERTIFICATE OF CORRECTION

| | |
|---|---|
| PATENT NO. | : 11,259,667 B2 |
| APPLICATION NO. | : 16/362492 |
| DATED | : March 1, 2022 |
| INVENTOR(S) | : Michael V. Colston, Daniel A. C. Altenritter and Daniel W. Sluder |

It is certified that error appears in the above-identified patent and that said Letters Patent is hereby corrected as shown below:

In the Specification
Column 25,   Line 17,   change "MC" to --NIC--

Signed and Sealed this
Sixteenth Day of August, 2022

*Katherine Kelly Vidal*

Katherine Kelly Vidal
*Director of the United States Patent and Trademark Office*